（12） United States Patent
Suzuoki et al.

(10) Patent No.: US 11,210,853 B2
(45) Date of Patent: Dec. 28, 2021

(54) IMAGE GENERATION APPARATUS AND IMAGE GENERATION METHOD

(71) Applicant: SONY INTERACTIVE ENTERTAINMENT INC., Tokyo (JP)

(72) Inventors: Masakazu Suzuoki, Tokyo (JP); Yuki Karasawa, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/770,420

(22) PCT Filed: Dec. 19, 2017

(86) PCT No.: PCT/JP2017/045592
§ 371 (c)(1),
(2) Date: Jun. 5, 2020

(87) PCT Pub. No.: WO2019/123548
PCT Pub. Date: Jun. 27, 2019

(65) Prior Publication Data
US 2020/0402308 A1 Dec. 24, 2020

(51) Int. Cl.
*G06T 19/00* (2011.01)
*G06T 7/50* (2017.01)
*H04N 9/31* (2006.01)

(52) U.S. Cl.
CPC ............. *G06T 19/00* (2013.01); *G06T 7/50* (2017.01); *H04N 9/3179* (2013.01)

(58) Field of Classification Search
CPC .......... G06T 19/00; G06T 7/50; H04H 9/3179
USPC ....................................................... 345/419
See application file for complete search history.

(56) References Cited

U.S. PATENT DOCUMENTS

| 2005/0286759 A1* | 12/2005 | Zitnick, III | G06T 7/596 |
| | | | 382/154 |
| 2008/0192047 A1* | 8/2008 | Radzikowski | G06T 15/005 |
| | | | 345/419 |
| 2009/0033661 A1* | 2/2009 | Miller | G06T 15/60 |
| | | | 345/426 |

FOREIGN PATENT DOCUMENTS

| CN | 107424206 A | 12/2017 |
| JP | 2005032140 A | 2/2005 |
| JP | 2008077408 A | 4/2008 |

(Continued)

OTHER PUBLICATIONS

International Search Report and Written Opinion dated Mar. 13, 2018, from International Application No. PCT/JP2017/045592, 8 sheets.

(Continued)

*Primary Examiner* — Hai Tao Sun
(74) *Attorney, Agent, or Firm* — Katten Muchin Rosenman LLP

(57) ABSTRACT

For a space including an object to be displayed, images of the space viewed from reference points of view are created in advance as reference images, and the reference images are combined according to a position of an actual point of view to draw a display image. In this case, a reference image not displaying reflection is used to determine the color of the object (S50). In a case of expressing reflection of another object (Y in S52), a position of the reflected object is estimated in a three-dimensional space (S54), a position on the reference image corresponding to the position is acquired (S56), and a color of the position is combined with the color of the object (S60).

8 Claims, 22 Drawing Sheets

(56) References Cited

FOREIGN PATENT DOCUMENTS

JP    2011-165081 A    8/2011
WO    2017072476 A1    5/2017

OTHER PUBLICATIONS

Takuma Miyoshi et al., "A Study of Arbitrary Viewpoint Image Generation Using Specular Reflection Tracking on Three-Dimensional Geometric Models. Proceedings of the 17th Meeting of IMPS", Oct. 24, 2012, pp. 71-72, non-official translation, 3 sheets.
Kaname Tomite, et al., "Arbitrary Viewpoint for Rendering from Multiple Omnidirectional Images for Interactive Walkthroughs. ITE Technical Report", Jan. 30, 2002, vol. 26, No. 9, pp. 65-70, 7 sheets.
International Preliminary Report on Patentability dated Jul. 2, 2020, from International Application No. PCT/JP2017/045592, 11 sheets.
Communication pursuant to Rule 164(1) EPC, dated Jun. 1, 2021, from EP Patent Application No. 17935172.1, 32 sheets.
Roberto Lopez Mendez: "Reflections based on local cubemaps in unity", ARM Mali Graphics 2014, Aug. 7, 2014 (Aug. 7, 2014), pp. 1-19, XP055313837, ARM Community Blog Retrieved from the Internet: URL:https://community.arm.com/groups/arm-mali-graphics/blog/2014/08/07/reflections-based-on-local-cubemaps [retrieved on Oct. 25, 2016] * section "Early reflection implementations", pp. 1 to 4 * *figure 3*, 20 sheets.
Notice of Reasons for Refusal dated Aug. 17, 2021, from Japanese Patent Applciation No. 2019-559912, 2 sheets.
The extended European search report dated Sep. 28, 2021, from European Application No. 17935172.1, 24 sheets.
Laszlo Szirmay-Kalos, et al: "Specular Effects on the GPU: State of the Art", Computer Graphics Forum: Journal of the Eur Association for Computer Graphics, vol. 28, No. 6, Sep. 1, 2009 (Sep. 1, 2009), pp. 1586-1617, XP055313840, Oxford ISSN: 0167-7055, DOI: 10.1111/j.1467-8659.2009.01350.x *section 3 "environment mapping", pp. 1593 to 1595* *section 4.1 "ray tracing distance maps", pp. 1596 to 1597* *section 4.1 "single reflections of refractions using the sampled geometry" * *figures 15-19*, 32 sheets.
Schwandt, Tobias, et al: "A Single Camera Image Based Approach for Glossy Reflections in Mixed Reality Applications", 2016 IEEE International Symposium On Mixed and Augmented Reality (ISMAR), IEEE, Sep. 19, 2016 (Sep. 19, 2016), pp. 37-43, XP033023405, DOI: 10.1109/ISMAR.2016.12 [retrieved on Dec. 12, 2016]*section 4.2 "filtering", paragraph 1* *section 4.2, sub-section "glossy cube map" * *figure 7*, 8 sheets.
Iorns, Thomas, et al: Real-Time Image Based Lighting for 360-Degree Panoramic Video , Feb. 25, 2016 (Feb. 25, 2016), ICIAP: Int Conference On Image Analysis and Processing, 17th International Conference, Naples, Italy, Sep. 9-13, 2013. Proceedings; [Lecture Notes in Computer Science; Lect.Notes Computer], Springer, Berlin, Heidelberg, pp. 139-1, XP047336566, ISBN: 378-3-642-17318-9 [retr on Feb. 25, 2016] *sect 3.2 "specular illumination", pp. 143-145* *figs 4-6*, 14 sheets.

* cited by examiner (a)  (b)

IMAGE GENERATION APPARATUS AND IMAGE GENERATION METHOD

TECHNICAL FIELD

The invention relates to an image generation apparatus and an image generation method of generating a display image according to a point of view.

BACKGROUND ART

An image display system that can view a target space from a free point of view is widely used. For example, a system is developed, in which a panoramic video is displayed on a head-mounted display, and when a user wearing the head-mounted display rotates the head, a panoramic image corresponding to the line-of-sight direction is displayed. The head-mounted display can be used to increase a feeling of immersion in a video or to improve the operability of an application such as a game. In addition, a walk-through system is also developed, in which a user wearing a head-mounted display can physically move to virtually walk around the space displayed as a video.

SUMMARY

Technical Problem

In the image display technique that corresponds to the free point of view regardless of the type of display apparatus, high responsiveness is required for the change in display in response to the movement of the point of view. On the other hand, to increase the sense of realism in the image world, the resolution needs to be increased, or complicated calculation needs to be executed. This increases the load of image processing. Therefore, the display does not catch up with the movement of the point of view, and as a result, the sense of realism may be lost.

The present invention has been made in view of the problem, and an object of the present invention is to provide a technique that can attain both of the responsiveness and the image quality of the image display with respect to the point of view.

Solution to Problem

To solve the problem, an embodiment of the present invention relates to an image generation apparatus. The image generation apparatus includes: a reference image data storage unit that stores data of a reference image representing an image of a space viewed from a predetermined reference point of view, the space including an object to be displayed; a point-of-view information acquisition unit that acquires information regarding a point of view; a projection unit that displays, on a plane of a display image, a position and a shape of an image of the object obtained by viewing the space from the point of view; a pixel value determination unit that determines, for each pixel in the display image, a color of the image of the object by using a color of an image of the same object in the reference image, specifies a position of an image of another object reflected on the object in the reference image, acquires a color at the position, and combines the colors to thereby determine a final value of the pixel representing the reflection; and an output unit that outputs data of the display image.

Here, the "predetermined reference point of view" denotes one or more predetermined number of points of view in the space that are set at predetermined position coordinates or set based on a predetermined distribution rule. The number and the positions of the points of view may be fixed or may be temporally changed according to a change or the like in the space.

Another embodiment of the present invention relates to an image generation method. The image generation method is an image generation method of generating a display image representing a space including an object to be displayed, the image generation method including: a step of acquiring information regarding a point of view; a step of displaying, on a plane of a display image, a position and a shape of an image of the object obtained by viewing the space from the point of view; a step of reading, from a memory storing data of a reference image representing an image of the space viewed from a predetermined reference point of view, the data of the reference image, determining, for each pixel in the display image, a color of the image of the object by using a color of an image of the same object in the reference image, specifying a position of an image of another object reflected on the object in the reference image, acquiring a color at the position, and combining the colors to thereby determine a final value of the pixel representing the reflection; and a step of outputting data of the display image.

Note that an arbitrary combination of the constituent elements and things obtained by converting the expression of the present invention between a method, an apparatus, a system, a computer program, a data structure, a recording medium, and the like are also effective as modes of the present invention.

Advantageous Effect of Invention

According to the present invention, both of the responsiveness and the image quality of the image display with respect to the point of view can be attained.

DESCRIPTION OF EMBODIMENT

In the present embodiment, an image is basically displayed in a field of view according to a point of view of a user. In that sense, the type of apparatus that displays the image is not particularly limited, and the apparatus may be any one of a wearable display, a flat-plate display, a projector, and the like. Here, an example of a head-mounted display among the wearable displays will be described.

In a case of the wearable display, a line of sight of the user can be substantially estimated by a built-in motion sensor. In cases of other display apparatuses, the line of sight can be detected as the user wears the motion sensor on the head, or a gaze point detection apparatus can be used to detect the line of sight. Alternatively, markers may be provided on the head of the user, and an image of the user may be captured to estimate the line of sight by analyzing the image. These techniques may also be combined.

Figure 1:
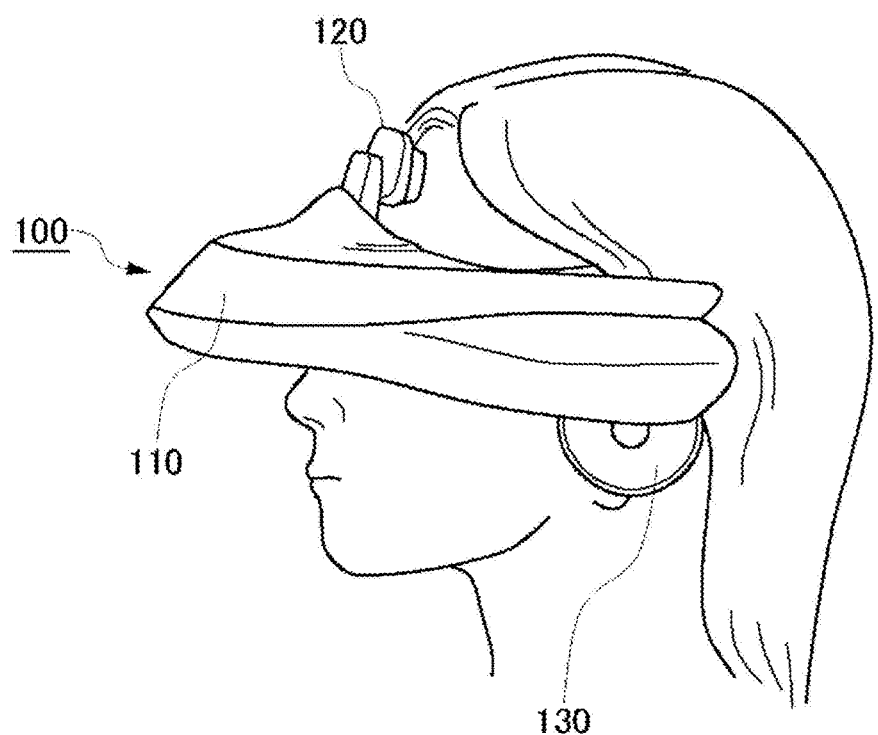
FIG. 1 is a diagram illustrating an example of exterior of a head-mounted display of the present embodiment.

FIG. 1 illustrates an example of exterior of a head-mounted display 100. The head-mounted display 100 includes a body unit 110, a frontal region contact unit 120, and a temporal region contact unit 130. The head-mounted display 100 is a display apparatus installed on the head of the user to view still images, moving images, and the like displayed on a display and to listen to sound, music, and the like output from a headphone. A built-in or external motion sensor of the head-mounted display 100 can measure posture information, such as a rotation angle and a tilt of the head of the user wearing the head-mounted display 100.

The head-mounted display 100 is an example of a "wearable display apparatus." Examples of the wearable display apparatus include not only the head-mounted display 100 in a narrow sense, but also arbitrary wearable display apparatuses, such as glasses, a glasses-type display, a glasses-type camera, a headphone, a headset (headphone with microphone), an earphone, an earring, an ear hook camera, a hat, a hat with camera, and a headband.

Figure 2:
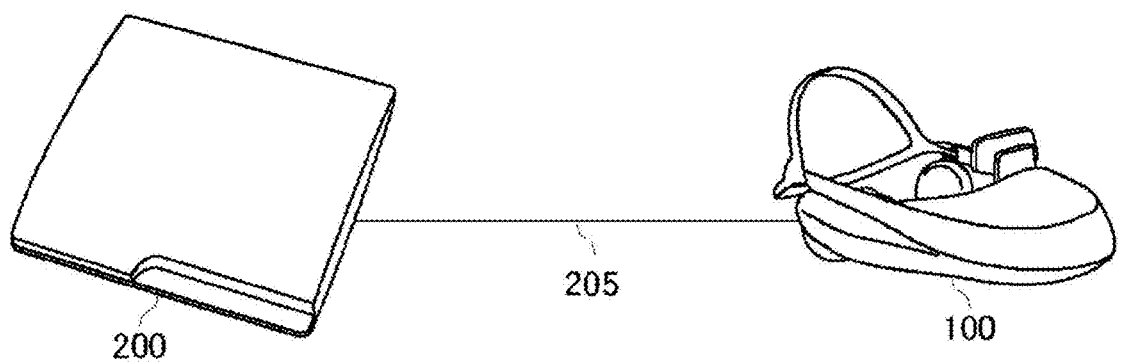
FIG. 2 is a configuration diagram of an information processing system of the present embodiment.

FIG. 2 is a configuration diagram of an information processing system according to the present embodiment. The head-mounted display 100 is connected to an image generation apparatus 200 through an interface 205 for connecting a peripheral device of wireless communication, a USB (Universal Serial Bus), or the like. The image generation apparatus 200 may be further connected to a server through a network. In that case, the server may provide the image generation apparatus 200 with an online application, such as a game in which a plurality of users can participate through the network.

The image generation apparatus 200 specifies the position of the point of view and the direction of the line of sight based on the position and the posture of the head of the user wearing the head-mounted display 100. The image generation apparatus 200 generates a display image such that the field of view corresponds to the position of the point of view and the direction of the line of sight and outputs the display image to the head-mounted display 100. In that sense, there can be various purposes of displaying the images. For example, the image generation apparatus 200 may advance an electronic game and generate a display image of a virtual world that is the stage of the game or may display still images or moving images to be enjoyed regardless of whether the world is a virtual world or a real world. In a case where the display apparatus is a head-mounted display, a state immersed into the display world can also be produced by displaying a panoramic image in a wide range of angle around the point of view.

Figure 3:
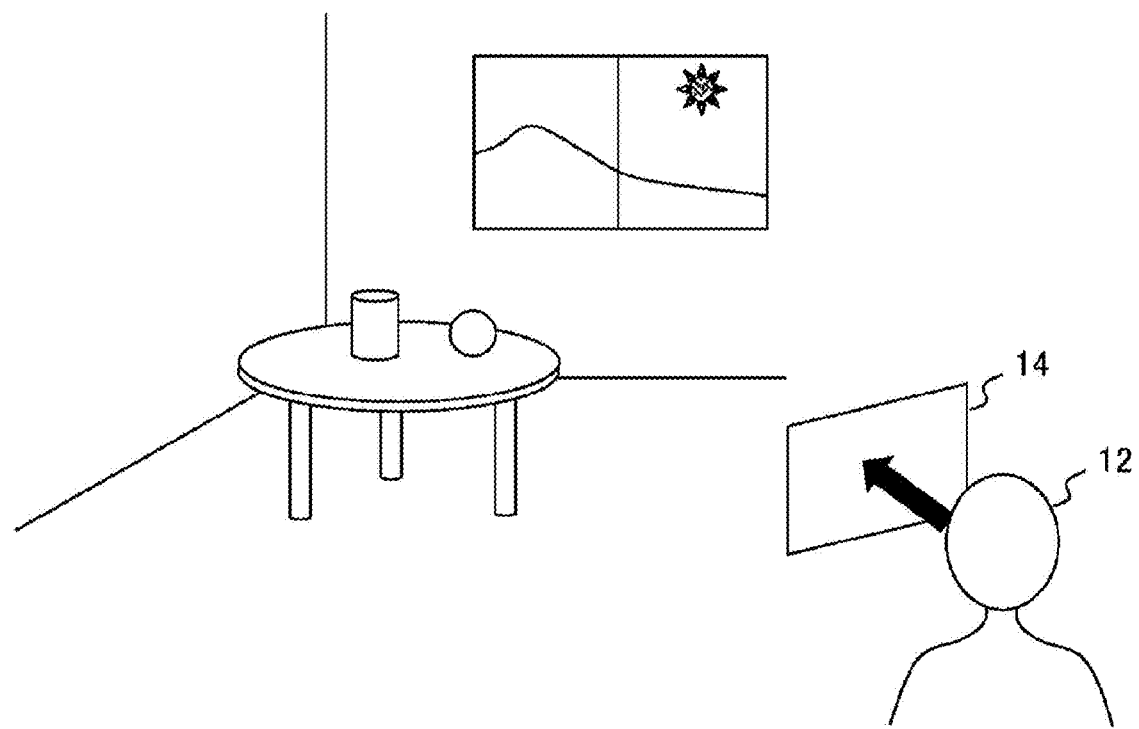
FIG. 3 is a diagram for describing an example of an image world displayed, on the head-mounted displayed, by an image generation apparatus of the present embodiment.

FIG. 3 is a diagram for describing an example of an image world displayed by the image generation apparatus 200 on the head-mounted display 100 in the present embodiment. In the state created in the example, a user 12 is in a room that is a virtual space. In a world coordinate system defining the virtual space, objects, such as walls, a floor, a window, a table, and things on the table, are arranged as illustrated in FIG. 3. The image generation apparatus 200 defines a view screen 14 in the world coordinate system according to the position of the point of view and the direction of the line of sight of the user 12 and projects an image of the objects to the view screen 14 to thereby draw a display image.

The position of the point of view and the direction of the line of sight of the user 12 (hereinafter, they may be comprehensively referred to as "point of view") can be acquired at a predetermined rate, and the position and the direction of the view screen 14 can be changed accordingly to display an image in the field of view corresponding to the point of view of the user. Stereo images with parallax can also be generated and displayed in front of the left and right eyes in the head-mounted display 100 to stereoscopically display the virtual space. As a result, the user 12 can experience a virtual reality as if the user 12 is in the room of the display world. Note that although the virtual world based on computer graphics is displayed in the illustrated example, a captured image of the real world, such as a panoramic photo, may be displayed, or the real world and the virtual world may be combined.

To provide a sense of realism in the display, it is desirable to reflect, as accurately as possible, the physical phenomenon occurred in the space to be displayed. For example, the propagation of various types of light reaching the eyes, such as diffuse reflection and specular reflection on the surface of the object and ambient light, can be accurately calculated to more realistically express the change in the tone and the luminance of the surface of the object caused by the movement of the point of view. Ray tracing is a representative method for realizing this. However, such highly accurate physical calculation may cause latency of display that cannot be ignored, particularly in an environment that permits a free point of view.

Therefore, in the present embodiment, an image as viewed from a specific point of view is acquired in advance and used to determine a pixel value of the display image with respect to an arbitrary point of view. That is, the color of the object displayed as an image in the display image is determined by extracting the color from the corresponding section of the image acquired in advance. Hereinafter, the point of view set in the preliminary image acquisition will be referred to as a "reference point of view," and the image acquired in advance as viewed from the reference point of view will be referred to as a "reference image" or an "image of reference point of view." Part of data used to draw the display image can be acquired in advance as a reference image to reduce the latency of display after the movement of the point of view. In addition, there are basically no time constraints in the generation stage of the reference image, and a lot of time can be spent for highly accurate physical calculation such as ray tracing.

A plurality of reference points of view can be dispersed and set in an estimated range of movement of the point of view at the time of the display, and the reference image can be prepared for each. In this way, the tones of the same object viewed from a plurality of points of view can be taken into account to more highly accurately express the object according to the point of view at the time of the display. More specifically, when the point of view at the time of the display matches one of the reference points of view, the pixel values of the reference image corresponding to the reference point of view can be adopted as it is. When the point of view at the time of the display is between a plurality of reference points of view, the pixel values of the reference images corresponding to the plurality of reference points of view can be combined to determine the pixel values of the display image.

Figure 4:
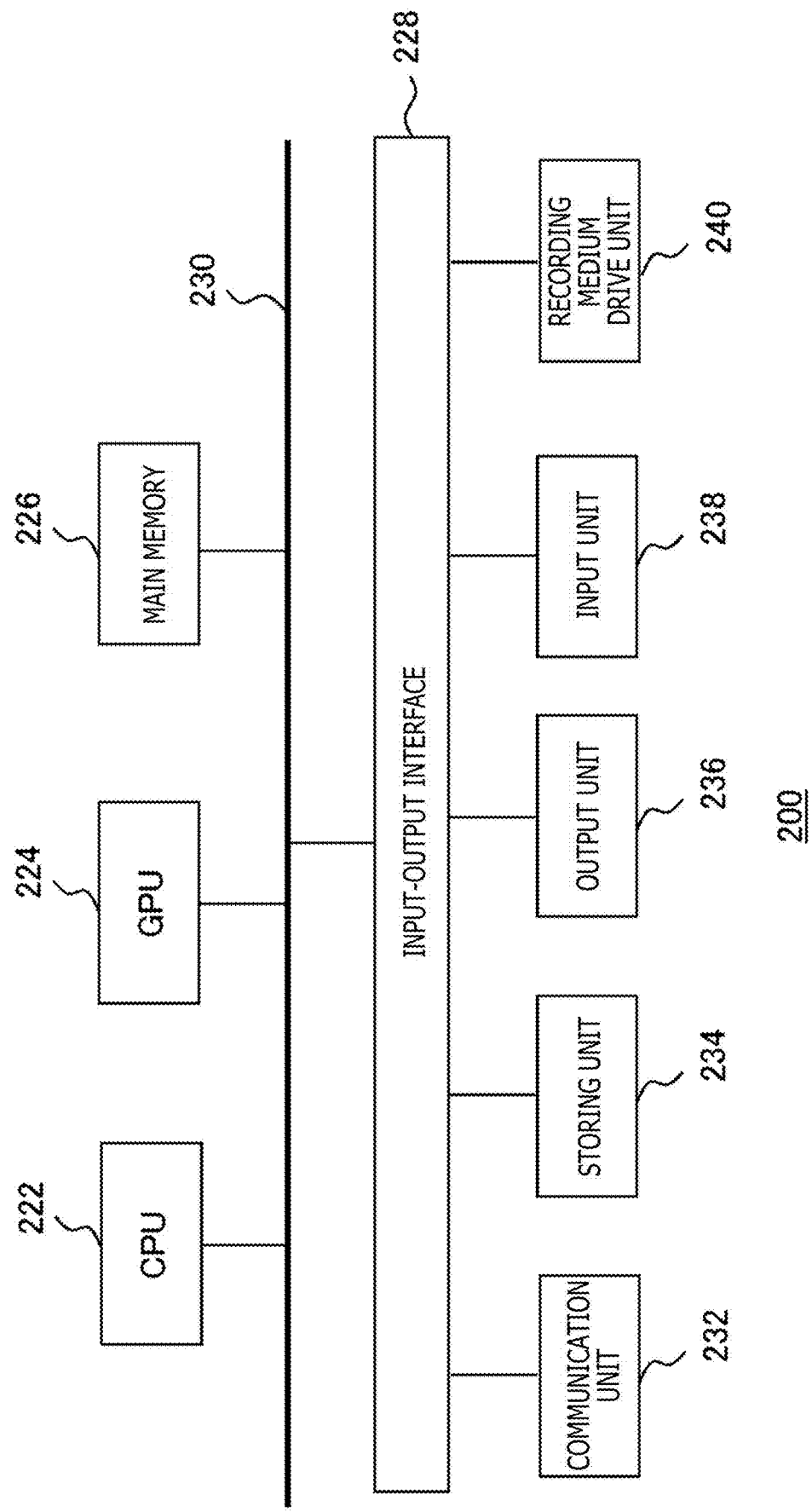
FIG. 4 is a diagram illustrating an internal circuit configuration of an information processing apparatus of the present embodiment.

FIG. 4 illustrates an internal circuit configuration of the image generation apparatus 200. The image generation apparatus 200 includes a CPU (Central Processing Unit) 222, a GPU (Graphics Processing Unit) 224, and a main memory 226. The components are connected to each other through a bus 230. An input-output interface 228 is further connected to the bus 230.

The input-output interface 228 includes: a communication 232 including a peripheral device interface of USB, IEEE (Institute of Electrical and Electronic Engineers) 1394, or the like or a network interface of wired or wireless LAN (Local Area Network); a storage unit 234, such as a hard disk drive and a non-volatile memory; an output unit 236 that outputs data to a display apparatus such as the head-mounted display 100; an input unit 238 that receives data from the head-mounted display 100; and a recording medium driving unit 240 that drives a removable recording medium, such as a magnetic disk, an optical disk, and a semiconductor memory.

The CPU 222 executes an operating system stored in the storage unit 234 to control the entire image generation apparatus 200. The CPU 222 also executes various programs read from the removable recording medium and loaded to the main memory 226 or various programs downloaded through the communication unit 232. The GPU 224 has a function of a geometry engine and a function of a rendering processor. The GPU 224 executes a drawing process according to a drawing command from the CPU 222 and stores the display image in a frame buffer not illustrated. In addition, the GPU 224 converts the display image stored in the frame buffer into a video signal and outputs the video signal to the output unit 236. The main memory 226 includes a RAM (Random Access Memory) and stores programs and data necessary for processing.

Figure 5:
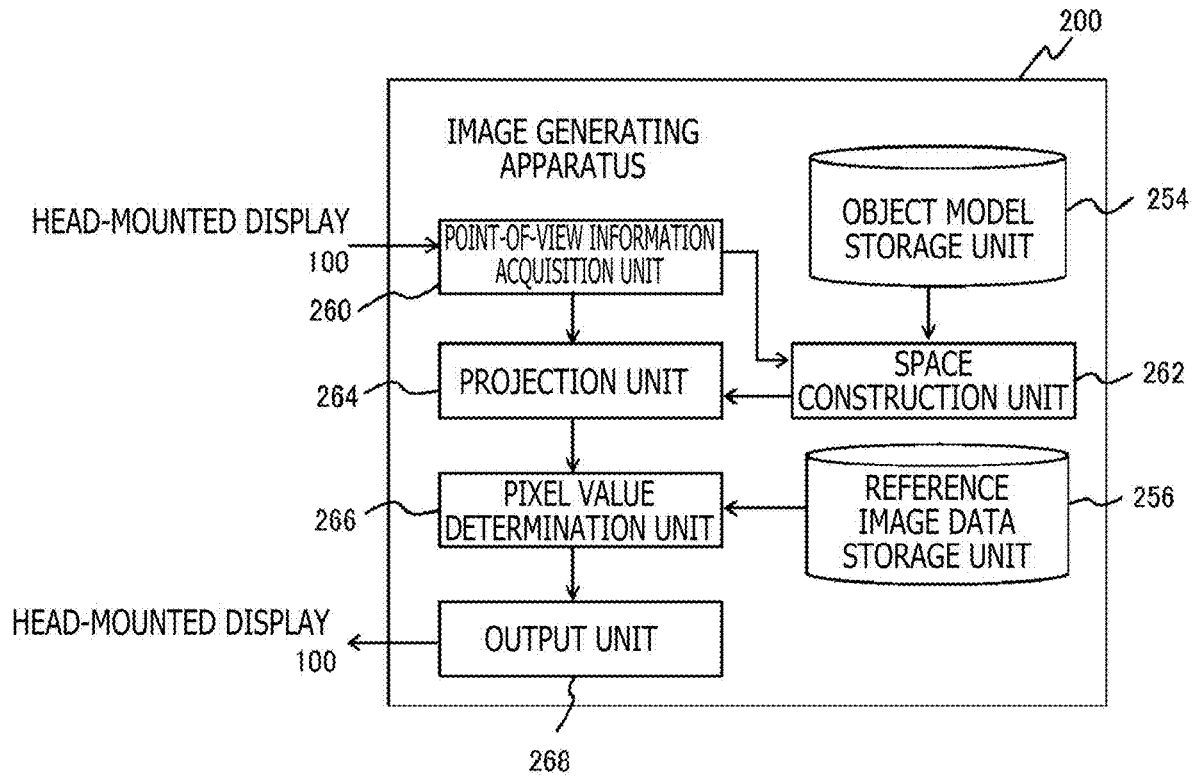
FIG. 5 is a diagram illustrating functional blocks of the image generation apparatus according to the present embodiment.

FIG. 5 illustrates a configuration of functional blocks of the image generation apparatus 200 according to the present embodiment. Although the image generation apparatus 200 may execute general information processing, such as advancing an electronic game or communicating with a server, as described above, a function of generating data of the display image according to the point of view is particularly focused and illustrated in FIG. 5. Note that at least part of the functions of the image generation apparatus 200 illustrated in FIG. 5 may be included in the head-mounted display 100. Alternatively, at least part of the functions of the image generation apparatus 200 may be included in the server connected to the image generation apparatus 200 through the network.

In addition, the functional blocks illustrated in FIG. 5 and FIG. 6 described later can be realized by components, such as the CPU, the GPU, and various memories illustrated in FIG. 4, in terms of hardware. The functional blocks are realized by programs that are loaded from the recording medium or the like to the memory and that perform various functions, such as a data input function, a data holding function, an image processing function, and a communication function, in terms of software. Therefore, those skilled in the art would understand that the functional blocks can be realized in various forms only by hardware, only by software, or by combinations of hardware and software, and the functional blocks are not limited to only one of the hardware and the software.

The image generation apparatus 200 includes: a point-of-view information acquisition unit 260 that acquires information regarding the point of view of the user; a space construction unit 262 that constructs a space including objects to be displayed; a projection unit 264 that projects the objects to a view screen; a pixel value determination unit 266 that determines values of pixels included in an image of the object to complete a display image; and an output unit 268 that outputs data of the display image to the head-mounted display 100. The image generation apparatus 200 further includes: an object model storage unit 254 that stores data regarding an object model necessary for constructing the space; and a reference image data storage unit 256 that stores data of a reference image.

The point-of-view information acquisition unit 260 includes the input unit 238, the CPU 222, and the like of FIG. 4 and acquires the position of the point of view and the direction of the line of sight of the user at a predetermined rate. For example, the point-of-view information acquisition unit 260 successively acquires output values of an acceleration sensor built in the head-mounted display 100 to thereby acquire the posture of the head. Furthermore, luminescent markers not illustrated are provided outside of the head-mounted display 100, and the point-of-view information acquisition unit 260 acquires a captured image of the luminescent markers from an imaging apparatus not illustrated to thereby acquire the position of the head in the real space.

Alternatively, an imaging apparatus not illustrated that captures an image corresponding to the field of view of the user may be provided on the head-mounted display 100 side, and a technique, such as SLAM (Simultaneous Localization and Mapping), may be used to acquire the position and the posture of the head. If the position and the posture of the head can be acquired in this way, the position of the point of view and the direction of the line of sight of the user can be substantially specified. Those skilled in the art would understand that the method of acquiring the information regarding the point of view of the user is not limited to a case of using the head-mounted display 100, and there can be various methods.

The space construction unit 262 includes the CPU 222, the GPU 224, the main memory 226, and the like of FIG. 4 and constructs a shape model of the space including the objects to be displayed. In the example illustrated in FIG. 3, the objects including the walls, the floor, the window, the table, the things on the table, and the like representing the inside of the room are arranged in the world coordinate system defining the virtual space. The information regarding the shapes of individual objects is read from the object model storage unit 254. The space constructed by the space construction unit 262 may be fixed or may be changed according to the progress of a game or the like.

Here, it is only necessary that the space construction unit 262 determine the shapes, the positions, and the postures of the objects, and a modeling method based on a surface model in general computer graphics can be used. The projection unit 264 includes the GPU 224, the main memory 226, and the like of FIG. 4 and sets the view screen according to the information of the point of view acquired by the point-of-view information acquisition unit 260. That is, the projection unit 264 sets the screen coordinates according to the position of the head and the direction of the face to thereby draw, on the screen plane, the space to be displayed based on the field of view corresponding to the position of the user and the direction of the user facing.

The projection unit 264 further projects, to the view screen, the objects in the space constructed by the space construction unit 262. A method of general computer graphics for perspective transformation of a mesh of polygons or the like can also be used for the process. The pixel value determination unit 266 includes the GPU 224, the main memory 226, and the like of FIG. 4 and determines the values of the pixels included in the images of the objects to be projected to the view screen. In this case, the pixel value determination unit 266 reads the data of the reference images from the reference image data storage unit 256 as described above and extracts and uses the values of the pixels representing the points on the same object.

For example, the pixel value determination unit 266 specifies the corresponding pixels from the reference images generated for the reference points of view around the actual point of view and weights and averages the pixels based on the distances and the angles between the actual point of view and the reference points of view to thereby set the pixel values of the display image. The ray tracing or the like can be used to accurately generate the reference images by spending a lot of time, and in the operation, the light-load calculation of reading the corresponding pixel values to obtain the weighted average can be performed. This can realize high-definition image expression close to a case of performing the ray tracing.

It is desirable to distribute the reference points of view to cover the range of movement of the point of view of the user. Note that the reference image is not limited to the graphics image drawn by ray tracing, and the reference image may be, for example, an image of the real space captured in advance from the reference point of view. In this case, the space construction unit 262 constructs a shape model of the imaged real space, and the projection unit 264 projects the shape model to the view screen corresponding to the point of view at the time of the display. Alternatively, the process of the space construction unit 262 and the projection unit 264 may not be executed as long as the positions of the images of the objects to be imaged can be determined in the field of view corresponding to the point of view at the time of the display.

Note that in a case of stereoscopically displaying the display image, the projection unit 264 and the pixel value determination unit 266 may apply the process to each of the points of view of the left eye and the right eye. The output unit 268 includes the CPU 222, the main memory 226, the output unit 236, and the like of FIG. 4 and transmits the data of the display image, which is completed by the pixel value determination unit 266 by determining the pixels values, to the head-mounted display 100 at a predetermined rate. In a case where the stereo images for stereoscopic display are generated, the output unit 268 generates an image by connecting the stereo images on the left and right and outputs the image as the display image. In a case of the head-mounted display 100 for viewing the display image through a lens, the output unit 268 may take into account the distortion caused by the lens to correct the display image.

Figure 6:
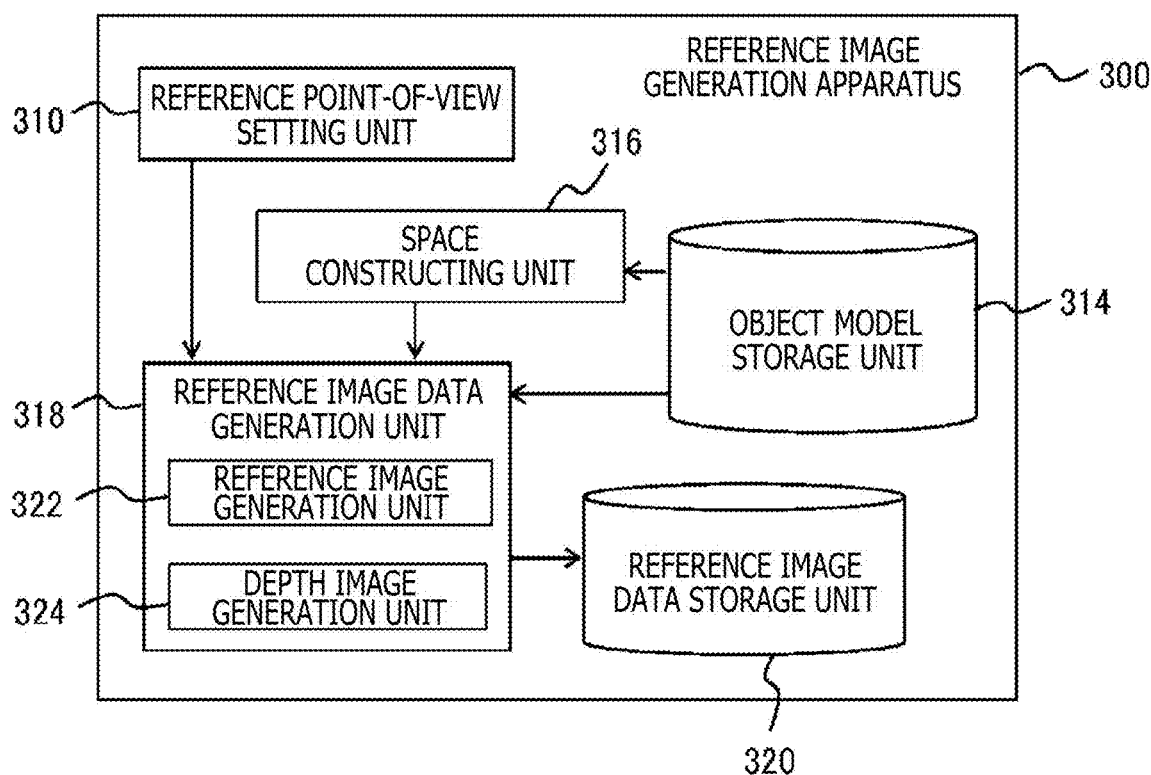
FIG. 6 is a diagram illustrating functional blocks of an apparatus that generates data of a reference image according to the present embodiment.

FIG. 6 illustrates functional blocks of an apparatus that generates data of the reference image in a case where the reference image is generated in the drawing process. A reference image generation apparatus 300 may be part of the image generation apparatus 200 of FIG. 5 or may be independently provided as an apparatus that generates data to be stored in the reference image data storage unit 256 of FIG. 5. In addition, electronic content including the data of the generated reference image and the object model used for the generation may be stored in a recording medium or the like, and the electronic content may be loaded to the main memory in the image generation apparatus 200 at the operation. The internal circuit configuration of the reference image generation apparatus 300 may be similar to the internal circuit configuration of the image generation apparatus 200 illustrated in FIG. 4.

The reference image generation apparatus 300 includes: a reference point-of-view setting unit 310 that sets a reference point of view; a space construction unit 316 that constructs a space including objects to be displayed; a reference image data generation unit 318 that generates data of the reference image for each reference point of view based on the constructed space; an object model storage unit 314 that stores data regarding the object model necessary for constructing the space; and a reference image data storage unit 320 that stores the data of the generated reference image.

The reference point-of-view setting unit 310 includes the input unit 238, the CPU 222, the main memory 226, and the like and sets the position coordinates of the reference point of view in the space to be displayed. Preferably, the reference point-of-view setting unit 310 distributes a plurality of reference points of view to cover the possible range of the point of view of the user as described above. Appropriate values of the range and the number of reference points of view vary depending on the configuration of the space to be displayed, the purpose of the display, the accuracy required for the display, the processing performance of the image generation apparatus 200, and the like. Therefore, the reference point-of-view setting unit 310 may receive an input of the user regarding the position coordinates of the reference point of view.

The space construction unit 316 includes the CPU 222, the GPU 224, the main memory 226, and the like and constructs a shape model of the space including the object to be displayed. The function corresponds to the function of the space construction unit 262 illustrated in FIG. 5. On the other hand, to accurately draw the image of the object using the ray tracing or the like, the reference image generation apparatus 300 of FIG. 6 uses a modeling method based on a solid model in which the color and the material of the object are taken into account. Therefore, model data of the object including information of the color, the material, and the like is stored in the object model storage unit 314.

The reference image data generation unit 318 includes the CPU 222, the GPU 224, the main memory 226, and the like and includes a reference image generation unit 322 and a depth image generation unit 324. For each reference point of view set by the reference point-of-view setting unit 310, the reference image generation unit 322 draws the object to be displayed that can be viewed from the reference point of view. Preferably, the reference image can be prepared as a panoramic image of 360° based on equirectangular projection or the like, and the point of view can be freely changed in all directions at the time of the display. Furthermore, it is desirable to spend a lot of time to calculate the propagation of light beam to thereby accurately indicate the appearance at each reference point of view in the reference image.

The depth image generation unit 324 generates a depth image corresponding to the reference image generated by the reference image generation unit 322. That is, the depth image generation unit 324 obtains the distance (depth value) from the view screen to the object indicated by each pixel of the reference image and provides the distance as a pixel value to generate the depth image. Note that in a case where the reference image is a panoramic image of 360°, the view screen has a spherical surface, and the depth value is the distance from the spherical surface to the object in the normal direction. The generated depth image is used to select the reference image to be used for determining the pixel values of the display image. The reference image data generation unit 318 stores the data of the reference image and the depth image generated in this way in the reference image data storage unit 320 in association with the position coordinates of the reference point of view.

Figure 7:
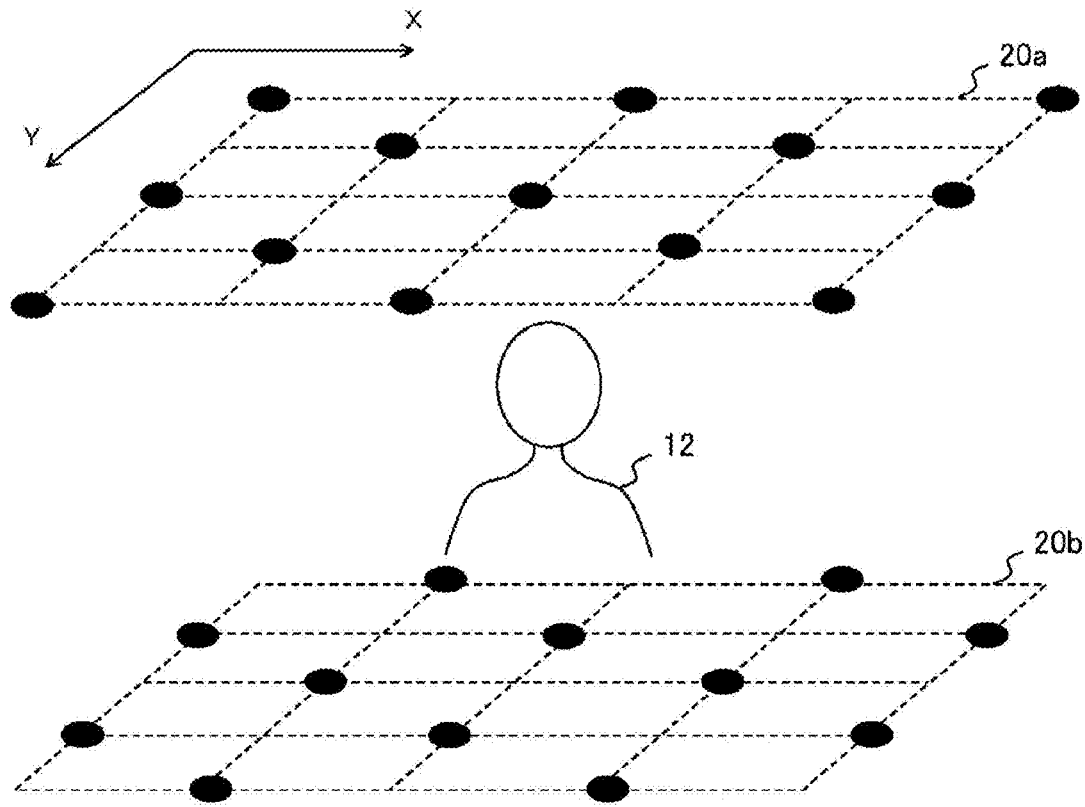
FIG. 7 is a diagram illustrating an example of setting a reference point of view according to the present embodiment.

FIG. 7 illustrates an example of setting the reference points of view. In the example, a plurality of reference points of view are set on a horizontal plane 20*a* at the level of the eyes of the user 12 standing and on a horizontal plane 20*b* at the level of the eyes of the user 12 sitting, as indicated by black circles. For example, the horizontal plane 20*a* is at 1.4 m from the floor, and the horizontal plane 20*b* is at 1.0 m from the floor. In addition, a movement range according to the content of display is estimated in the left and right direction (X-axis direction in FIG. 7) and in the front and back direction (Y-axis direction in FIG. 7) around a standard position (home position) of the user, and the reference points of view are distributed to corresponding rectangular regions on the horizontal planes 20*a* and 20*b*.

In the example, the reference points of view are alternately arranged at intersections of a grid dividing the rectangular regions into four equal parts in the X-axis direction and the Y-axis direction. In addition, the reference points of view are shifted and arranged so that the reference points of view do not overlap in the upper and lower horizontal planes 20*a* and 20*b*. As a result, a total of twenty five reference points of view including thirteen points on the upper horizontal plane 20*a* and twelve points on the lower horizontal plane 20*b* are set in the example illustrated in FIG. 7.

However, it is not intended to limit the distribution of the reference points of view to this. The reference points of view may be distributed on a plurality of planes including a vertical plane or the like or may be distributed on a curved surface such as a spherical surface. In addition, the distribution may not be uniform, and the reference points of view may be distributed at a higher density in a range where the user is likely to exist. Furthermore, in a case of producing a motion of moving or deforming the object to be displayed, the reference points of view may also be moved accordingly. In this case, the reference image with respect to each reference point of view includes data of moving images reflecting the movement.

In addition, a plurality of reference points of view may be set to surround a specific object, and dedicated reference images may be prepared. The reference images may be combined in generating the display image of the entire space including the object. In this case, the image generation apparatus 200 projects the mesh of the object to the view screen in a manner similar to the other meshes and then uses the separately prepared reference images dedicated to the object to determine the pixel values. In this way, more detailed expression of an important object, an object that is likely to be closely viewed, and the like and movement or deformation of only a specific object can be realized without increasing the amount of reference image data.

Figure 8:
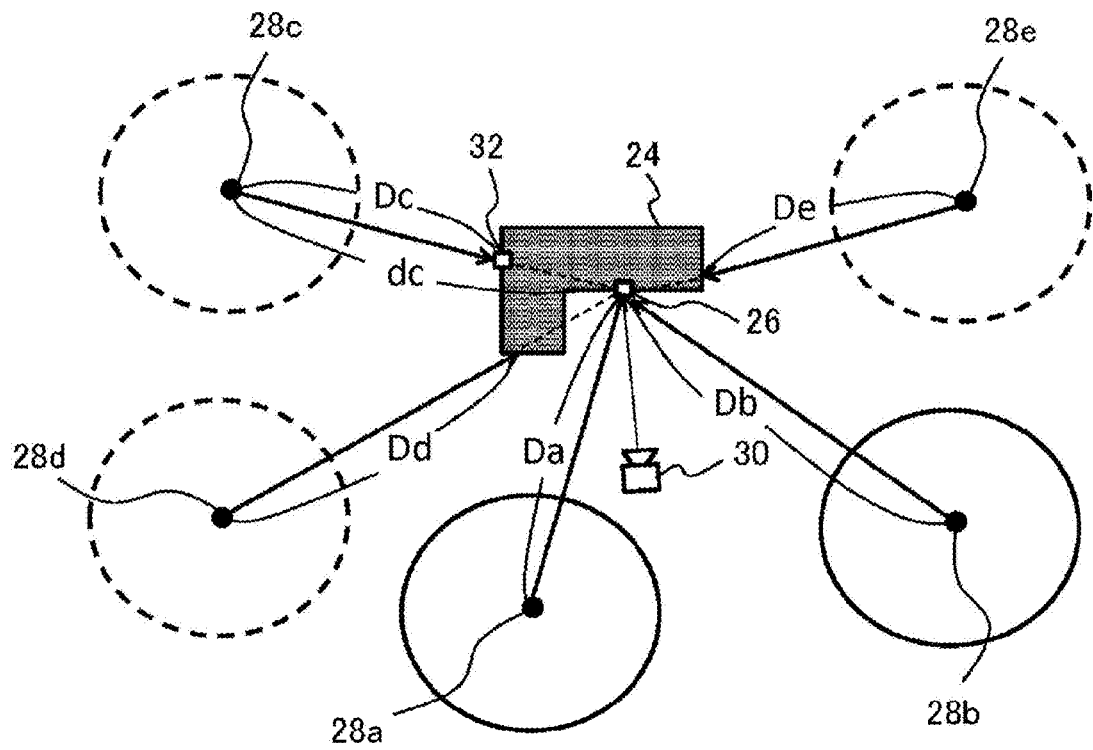
FIG. 8 is a diagram for describing a method of selecting a reference image to be used to determine a pixel value of a display image executed by a pixel value determination unit according to the present embodiment.

FIG. 8 is a diagram for describing a method of selecting the reference image to be used to determine the pixel values of the display image executed by the pixel value determination unit 266 of the image generation apparatus 200. FIG. 8 illustrates a state of overlooking the space to be displayed including an object 24. It is assumed that five reference points of view 28*a* to 28*e* are set in the space, and the data of the reference image is generated for each. Circles around the reference points of view 28*a* to 28*e* in FIG. 8 schematically illustrate screen surfaces of the reference images prepared as an omnidirectional panoramic image.

Assuming that the point of view of the user at the time of the image display is at the position of a virtual camera 30, the projection unit 264 determines the view screen to correspond to the virtual camera 30 and projects the model shape of the object 24. As a result, the correspondence between the pixel in the display image and the position on the surface of the object 24 is found out. Furthermore, in a case of, for example, determining the value of the pixel representing an image of a point 26 on the surface of the object 24, the pixel value determination unit 266 first specifies the reference image displaying the image of the point 26.

The position coordinates of the reference points of view 28a to 28e and the point 26 in the world coordinate system are known, and the distances can be easily obtained. In FIG. 8, the distance is indicated by the length of a line segment connecting each of the reference points of view 28a to 28e and the point 26. In addition, the point 26 can also be projected to the view screen of each reference point of view to specify the position of the pixel where the image of the point 26 is to be displayed in each reference image. On the other hand, depending on the position of the reference point of view, the point 26 may be on the back side of the object or may be hidden by an object in front, and the image may not be displayed at the position in the reference image.

Therefore, the pixel value determination unit 266 checks the depth image corresponding to each reference image. The pixel value of the depth image represents the distance from the screen surface to the object displayed as an image in the corresponding reference image. Therefore, the distance from the reference point of view to the point 26 and the depth value of the pixel in the depth image where the image of the point 26 is to be displayed can be compared to determine whether or not the image is an image of the point 26.

For example, a point 32 on the back side of the object 24 exists on the line of sight from the reference point of view 28c to the point 26, and the pixel where the image of the point 26 in the corresponding reference image is to be displayed actually represents the image of the point 32. Therefore, the value indicated by the pixel of the corresponding depth image is the distance to the point 32, and a distance Dc obtained by converting the value into a value with the start point at the reference point of view 28c is clearly smaller than a distance dc to the point 26 calculated from the coordinate value. Therefore, when the difference between the distance Dc obtained from the depth image and the distance dc to the point 26 obtained from the coordinate value is equal to or greater than a threshold, the reference image is removed from the calculation of the pixel value representing the point 26.

Similarly, the differences between distances Dd and De from the corresponding pixels obtained from the depth images of the reference points of view 28d and 28e to the object and distances from the reference points of view 28d and 28e to the point 26 are equal to or greater than the threshold, and the reference images are removed from the calculation. On the other hand, it can be specified by the threshold determination that distances Da and Db from the corresponding pixels obtained from the depth images of the reference points of view 28a and 28b to the object are substantially the same as distances from the reference points of view 28a and 28b to the point 26. The pixel value determination unit 266 uses the depth values in this way to perform screening to thereby select, for each pixel of the display image, the reference image to be used to calculate the pixel value.

Although FIG. 8 illustrates five reference points of view, the comparison using the depth value is actually applied to all of the reference points of view distributed as illustrated in FIG. 7. As a result, a more accurate display image can be drawn. On the other hand, referring to approximately twenty five depth images and reference images for all pixels of the display image may produce a load that cannot be ignored depending on the processing performance of the apparatus. Therefore, prior to the selection of the reference image to be used for determining the pixel value as described above, the reference images as candidates for the selection may be narrowed down by a predetermined standard. For example, the reference points of view within a predetermined range from the virtual camera 30 are extracted, and the selection process using the depth values is applied to only the reference images from the reference points of view.

In this case, the upper limit of the number of reference points of view to be extracted may be set to ten, twenty, or the like, and the range of extraction may be adjusted so that the number of reference points of view falls within the upper limit. The reference points of view may be chosen randomly or based on a predetermined rule. In addition, the number of reference points of view to be extracted may vary depending on the region on the display image. For example, in a case of using the head-mounted display to realize the virtual reality, the center region of the display image matches the direction of the line of sight of the user, and it is desirable to draw the center region with accuracy higher than the accuracy of the peripheral region.

Therefore, a larger number of reference points of view (reference images) are set as selection candidates for a pixel in a predetermined range from the center of the display image, and on the other hand, the number of selection candidates is reduced for a pixel outside of the range. For example, approximately twenty reference images can be set as selection candidates in the center region, and approximately ten reference images can be set as selection candidates in the peripheral region. However, the number of regions is not limited to two, and the number of regions may be three or more. Furthermore, there can be not only the sorting dependent on the distance from the center of the display image, but also dynamic sorting performed according to the region of the image of the target object or the like. In this way, the number of reference images to be referenced can be controlled based on a factor other than whether or not the image of the object is displayed, and the display image can be drawn under optimal conditions in which the processing performance of the apparatus, the accuracy required for the display, the content of the display, and the like are taken into account.

Figure 9:
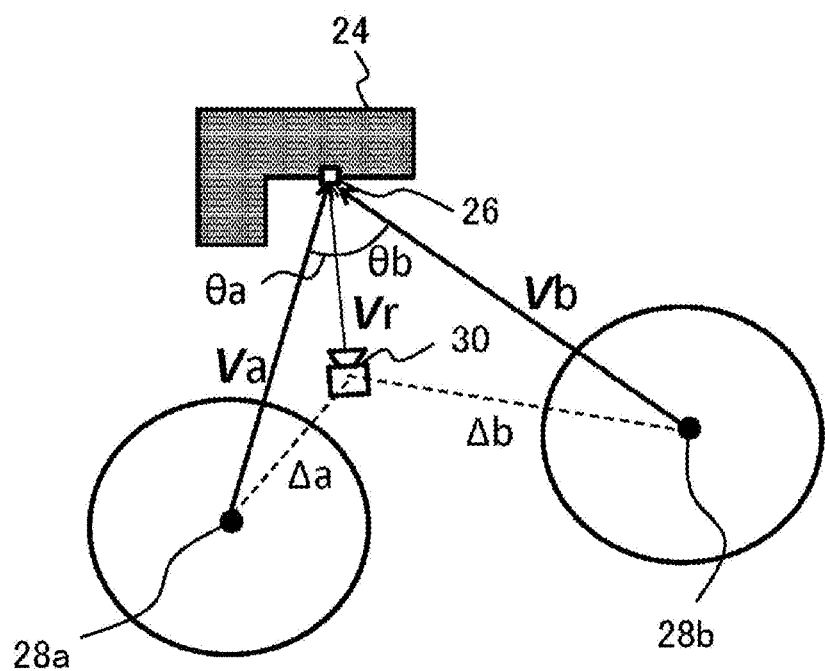
FIG. 9 is a diagram for describing a method of determining the pixel value of the display image executed by the pixel value determination unit according to the present embodiment.

FIG. 9 is a diagram for describing a method of determining the pixel value of the display image executed by the pixel value determination unit 266. As illustrated in FIG. 8, it is found out that the image of the point 26 of the object 24 is displayed in the reference images of the reference points of view 28a and 28b. The pixel value determination unit 266 basically blends the pixel values of the image of the point 26 in the reference images to determine the pixel value of the image of the point 26 in the display image corresponding to the actual point of view.

Here, a pixel value C in the display image is calculated as follows, where $c_1$ and $c_2$ represent the pixel values (color values) in the reference images of the reference points of view 28a and 28b, respectively, regarding the image of the point 26.

$$C = w_1 \cdot c_1 + w_2 \cdot c_2$$

Here, coefficients $w_1$ and $w_2$ represent weights in a relationship of $w_1 + w_2 = 1$, that is, contribution ratios of the reference images, and the coefficients $w_1$ and $w_2$ are determined based on the positional relationship between the reference points of view 28a and 28b and the virtual camera 30 representing the actual point of view. For example, the closer the distance from the virtual camera 30 to the reference point of view, the larger the coefficient provided. In this way, the contribution ratio is increased.

In this case, the weighting coefficients can have the following functions, where $\Delta a$ and $\Delta b$ represent the distances from the virtual camera 30 to the reference points of view 28a and 28b, and sum=$1/\Delta a^2 + 1/\Delta b^2$ is set.

$$w_1 = (1/\Delta a^2)/\text{sum}$$

$$w_2 = (1/\Delta b^2)/\text{sum}$$

The equations are generalized as follows, where N represents the number of reference images used, i ($1 \leq i \leq N$) represents the identification number of the reference point of view, $\Delta i$ represents the distance from the virtual camera 30 to the ith reference point of view, $c_i$ represents the corresponding pixel value in each reference image, and $w_i$ represents the weight coefficient. However, it is not intended to limit the formulas to these.

[Math. 1]

$$C = \sum_{i=1}^{N} w_i \cdot c_i \quad \text{(Equation 1)}$$

$$w_i = \frac{1}{\Delta i^2} \cdot \frac{1}{\text{sum}}, \text{sum} = \sum_{i=1}^{N} \frac{1}{\Delta i^2}$$

Note that in a case where $\Delta i$ is 0 in the equations, that is, in a case where the virtual camera 30 matches one of the reference points of view, the weighting coefficient for the pixel value of the corresponding reference image is set to 1, and the weighting coefficients for the pixel values of the other reference images are set to 0. In this way, the reference image accurately created for the point of view can be reflected as it is on the display image.

In addition, the parameter used to calculate the weighting coefficient is not limited to the distance from the virtual camera to the reference point of view. For example, the parameters may be based on angles $\theta a$ and $\theta b$ ($0 \leq \theta a, \theta b \leq 90°$) formed by gaze vectors Va and Vb from the reference points of view to the point 26 with respect to a gaze vector Vr from the virtual camera 30 to the point 26. For example, inner products (Va·Vr) and (Vb·Vr) of the vectors Va and Vb and the vector Vr can be used to calculate the weighting coefficients as follows.

$$w_1 = (Va \cdot Vr)/((Va \cdot Vr) + (Vb \cdot Vr))$$

$$w_2 = (Vb \cdot Vr)/((Va \cdot Vr) + (Vb \cdot Vr))$$

The equations are generalized as follows as described above, where N represents the number of reference images used, $V_i$ represents the gaze vector from the reference point of view i to the point 26, and $w_i$ represents the weighting coefficient.

[Math. 2]

$$w_i = \frac{(V_i \cdot Vr)}{\sum_{i=1}^{N}(V_i \cdot Vr)} \quad \text{(Equation 2)}$$

In any case, the specific formula is not particularly limited as long as a calculation rule is implemented such that the closer the state of the reference point of view to the virtual camera 30 with respect to the point 26, the larger the weighting coefficient. The "closeness of state" may be evaluated from diversified viewpoints based on both of the distance and the angle to determine the weighting coefficient. Furthermore, the shape of the surface of the object 24 at the point 26 may also be taken into account. The luminance of the reflected light from the object generally has angular dependence based on the inclination (normal line) of the surface. Therefore, the angle formed by the normal vector at the point 26 and the gaze vector Vr from the virtual camera 30 and the angles formed by the normal vector and the gaze vectors Va and Vb from the reference points of view may be compared, and a larger weighting coefficient may be set for a smaller difference.

In addition, the function for calculating the weighting coefficient may be switched according to the attributes, such as material and color, of the object 24. For example, in a case of material in which specular reflection components are dominant, the material has strong directivity, and the observed color significantly varies depending on the angle of the gaze vector. On the other hand, in a case of material in which diffuse reflection components are dominant, the color does not significantly vary with respect to the angle of the gaze vector. Therefore, in the former case, a function may be used such that the closer the gaze vector of the reference point of view to the gaze vector Vr from the virtual camera 30 to the point 26, the larger the weighting coefficient. In the latter case, the weighting coefficients may be equal for all of the reference points of view, or a function may be used such that the angular dependence is smaller than in a case where the specular reflection components are dominant.

For the same reason, in a case of the material in which the diffuse reflection components are dominant, the reference images to be used to determine the pixel value C of the display image may be thinned out, or only the reference images with gaze vectors in which the closeness of angle to the actual gaze vector Vr is equal to or greater than a predetermined value may be used, thereby reducing the number of reference images to reduce the load of calculation. In this way, in a case of using different determination rules of the pixel value C according to the attributes of the object, data indicating the attributes, such as the material of the object indicated by each image of the reference images, is associated with each image of the reference images and stored in the reference image data storage unit 256.

According to the mode, the surface shape and the material of the object can be taken into account to more accurately reflect the directivity of specularly reflected light or the like on the display image. Note that two or more of the calculation based on the shape of the object, the calculation based on the attributes, the calculation based on the distance from the virtual camera to the reference point of view, and the calculation based on the angle formed by each gaze vector may be combined to determine the weighting coefficient.

Figure 10:
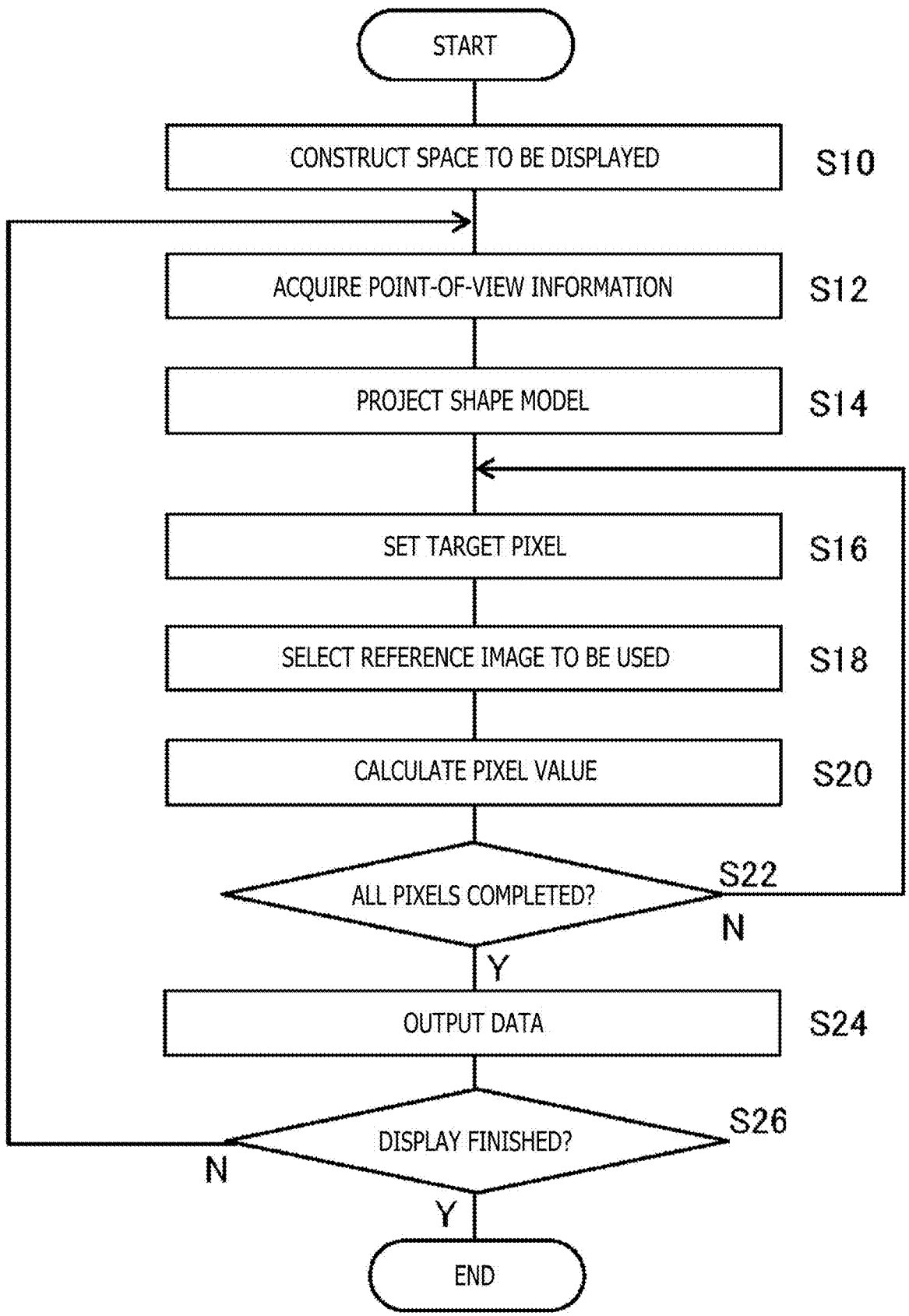
FIG. 10 is a flow chart illustrating a procedure of generating the display image according to a point of view executed by the image generation apparatus according to the present embodiment.

Next, the operation of the image generation apparatus that can be realized by the configuration described above will be described. FIG. 10 is a flow chart illustrating a procedure of generating a display image according to the point of view executed by the image generation apparatus 200. The flow chart is started in a state of accepting the movement of the point of view after an initial image is displayed by starting an application or the like started by a user operation. As described above, various types of information processing, such as an electronic game, may be executed in parallel with the illustrated display process. First, the space construction unit 262 constructs, in the world coordinate system, a three-dimensional space including the object to be displayed (S10).

On the other hand, the point-of-view information acquisition unit 260 specifies the position of the point of view and the direction of the line of sight at this point based on the position and the posture of the head of the user (S12). Next, the projection unit 264 sets a view screen with respect to the point of view and projects the object existing in the space to be displayed (S14). As described above, it is only necessary to take into account the surface shape in the process, such as by performing a perspective transformation of the vertices of the polygon mesh forming the three-dimensional model. Next, the pixel value determination unit 266 sets one target pixel among the pixels inside of the mesh projected in this way (S16) and selects the reference images to be used for determining the pixel value (S18).

That is, as described above, the pixel value determination unit 266 determines the reference images displaying the image of the point on the object indicated by the target pixel based on the depth images of the reference images. Furthermore, the pixel value determination unit 266 determines the weighting coefficients based on the reference points of view of the reference images, the positional relationship with the virtual camera corresponding to the actual point of view, the shape and the material of the position, and the like and then obtains a weighted average or the like of the corresponding pixel values of the reference images to determine the value of the target pixel (S20). Note that those skilled in the art would understand that there can be various ways of statistical processing and interpolation processing other than the weighted average regarding the calculation of deriving the pixel value of the target pixel from the pixel values of the reference images.

The process of S18 and S20 is repeated for all of the pixels on the view screen (N in S22, S16). Once the pixel values of all of the pixels are determined (Y in S22), the output unit 268 outputs the data as data of the display image to the head-mounted display 100 (S24). Note that in a case of generating the display images for the left eye and for the right eye, the process of S16 to S22 is applied to each display image, and the display images are appropriately connected and output. If the display does not have to be finished, the next point-of-view information is acquired to repeat the generation and output process of the display image (N in S26, S12 to S24). If the display process has to be finished, the entire process is finished (Y in S26).

Note that although the reference images are used for all of the pixels on the view screen to determine the pixel value in the example of FIG. 10, the drawing method may be switched depending on the region on the display image or the position of the point of view. For example, only conventional texture mapping may be performed for the image of an object in which the light and the tone do not have to be changed after the movement of the point of view. In addition, a state observed only at a local point of view, such as reflected light with high directivity, is not entirely expressed from surrounding reference images in some cases. Therefore, the drawing can be switched to drawing by ray tracing only when the point of view is in the range, thereby reducing the amount of data prepared as the reference images.

In the configuration described above, increasing the number of reference points of view is effective to cover various situations to immediately draw accurate images by, for example, observing an object in a complicated shape from free points of view. On the other hand, the data size of the reference images necessary for the display increases with an increase in the number of reference points of view, and this may put pressure on the storage region and the transmission band and may reduce the efficiency of data reading. Therefore, in generating the data of the reference images, the reference image generation apparatus 300 deletes, from one of the reference images, the data of a part of the object commonly viewed from a plurality of reference points of view. As a result, the increase in the data size of the reference images can be reduced even when the number of reference points of view is increased.

Figure 11:
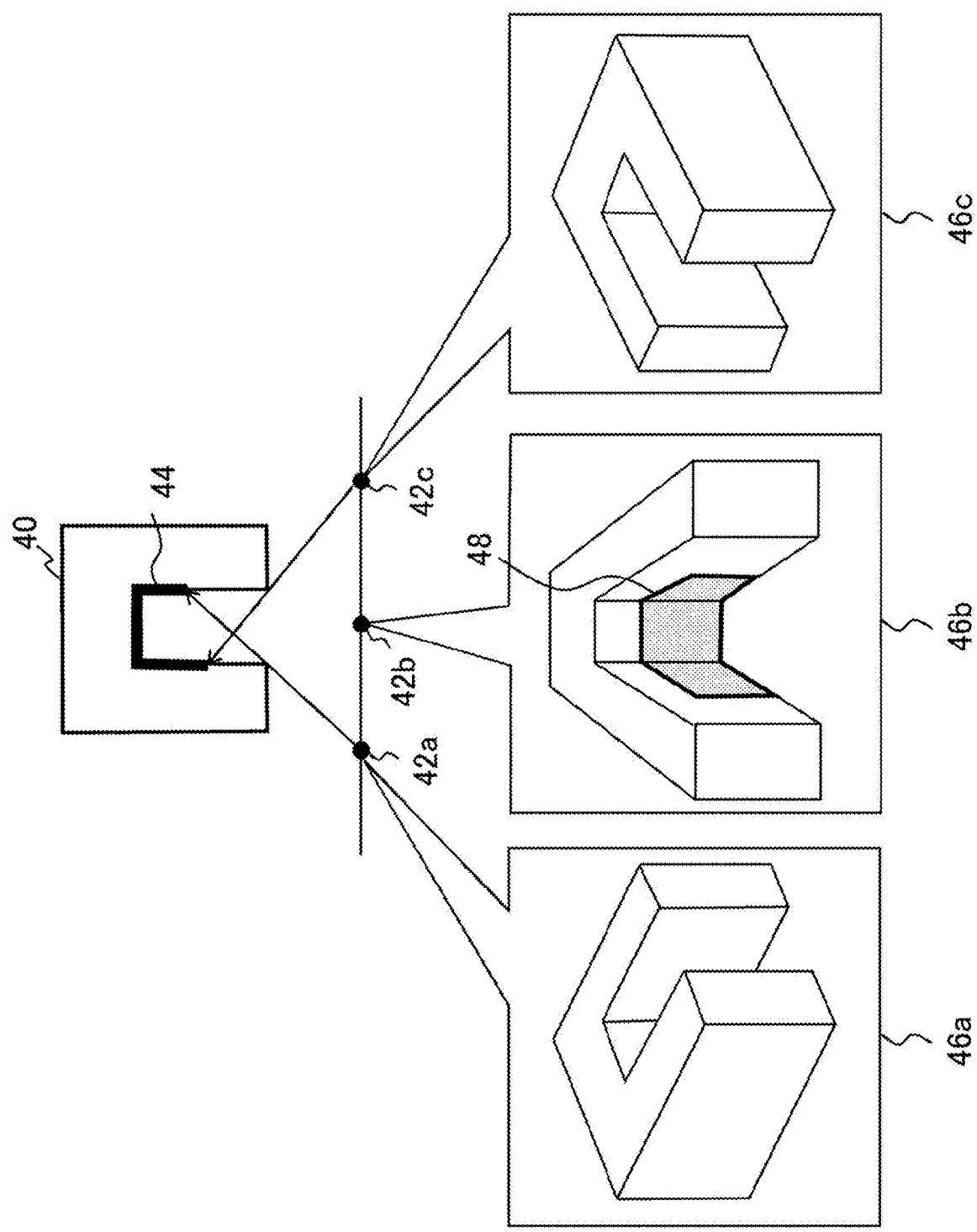
FIG. 11 is a diagram schematically illustrating an appearance of an object from a plurality of reference points of view according to the present embodiment.

FIG. 11 schematically illustrates appearances of an object from a plurality of reference points of view. An upper part of FIG. 11 illustrates a state of overlooking the space to be displayed including an object 40 and a plurality of reference points of view 42a, 42b, and 42c. In the example, the object 40 includes a recessed part on surfaces facing an array of three reference points of view 42a, 42b, and 42c. In this case, although inside 44 of the recess is observed from the reference point of view 42b in front of the opening of the recessed part, the inside 44 cannot be viewed from the reference points of view 42a and 42c not in front of the opening.

A lower part of FIG. 11 illustrates parts of the images of the object 40 in reference images 46a, 46b, and 46c obtained for the reference points of view 42a, 42b, and 42c. When the height direction is taken into account, a shaded part 48 of the image of the object 40 is displayed only in the reference image 46b. In other words, parts other than the part 48 are also displayed in the other reference images 46a and 46c. Therefore, even if, for example, the data of the reference image 46b other than the data of the shaded part 48 is deleted, the other reference images 46a and 46c can be used to draw the object 40.

Figure 12:
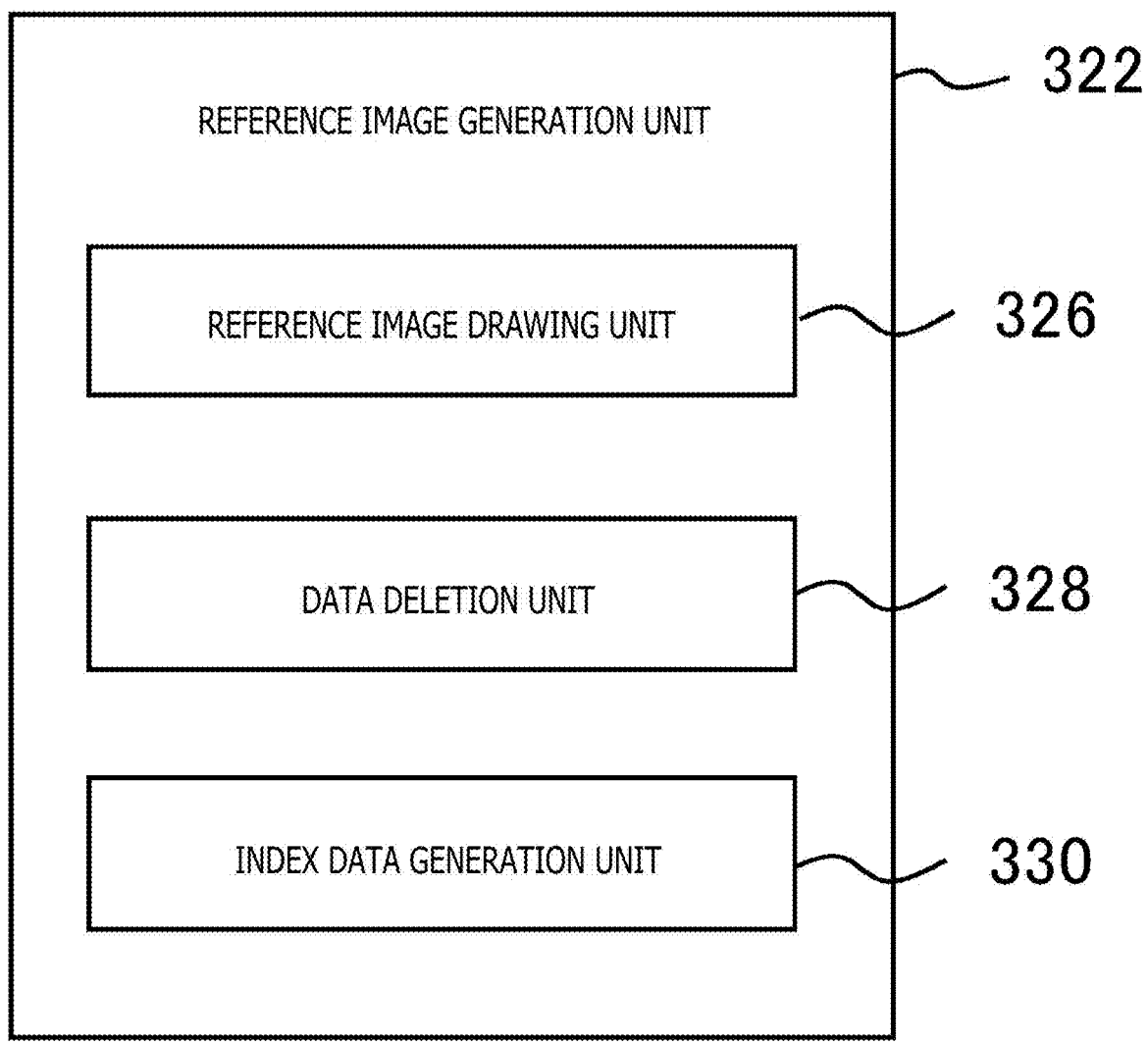
FIG. 12 is a diagram illustrating a configuration of functional blocks of a reference image generation unit in a reference image generation apparatus with a function of deleting part of data of the reference image according to the present embodiment.

FIG. 12 illustrates a configuration of functional blocks of the reference image generation unit 322 in the reference image generation apparatus 300 with a function of deleting part of the data of the reference images. The reference image generation unit 322 includes a reference image drawing unit 326, a data deletion unit 328, and an index data generation unit 330. As described with reference to FIG. 6, the reference image drawing unit 326 draws, for each reference point of view set by the reference point-of-view setting unit 310, the object to be displayed as viewed from the reference point of view. In a case where the same point on the same object is displayed in a plurality of reference images, the data deletion unit 328 deletes the data of the part from one of the reference images.

For example, the data deletion unit 328 deletes the data of the region other than the shaded part 48 in the reference image 46b illustrated in FIG. 11. In this case, the deletion target can be determined on the basis of tile images obtained by dividing the image plane into images in a predetermined size, and this can increase the efficiency of data reading in generating the display image. The index data generation unit 330 generates, for each reference image, index data in which identification information indicating the position coordinates or the position of the tile image on the reference image is associated with the entity of the image data of each tile image. The position coordinates of the tile image for which the data is deleted are associated with identification information indicating that the data is invalid.

Figure 13:
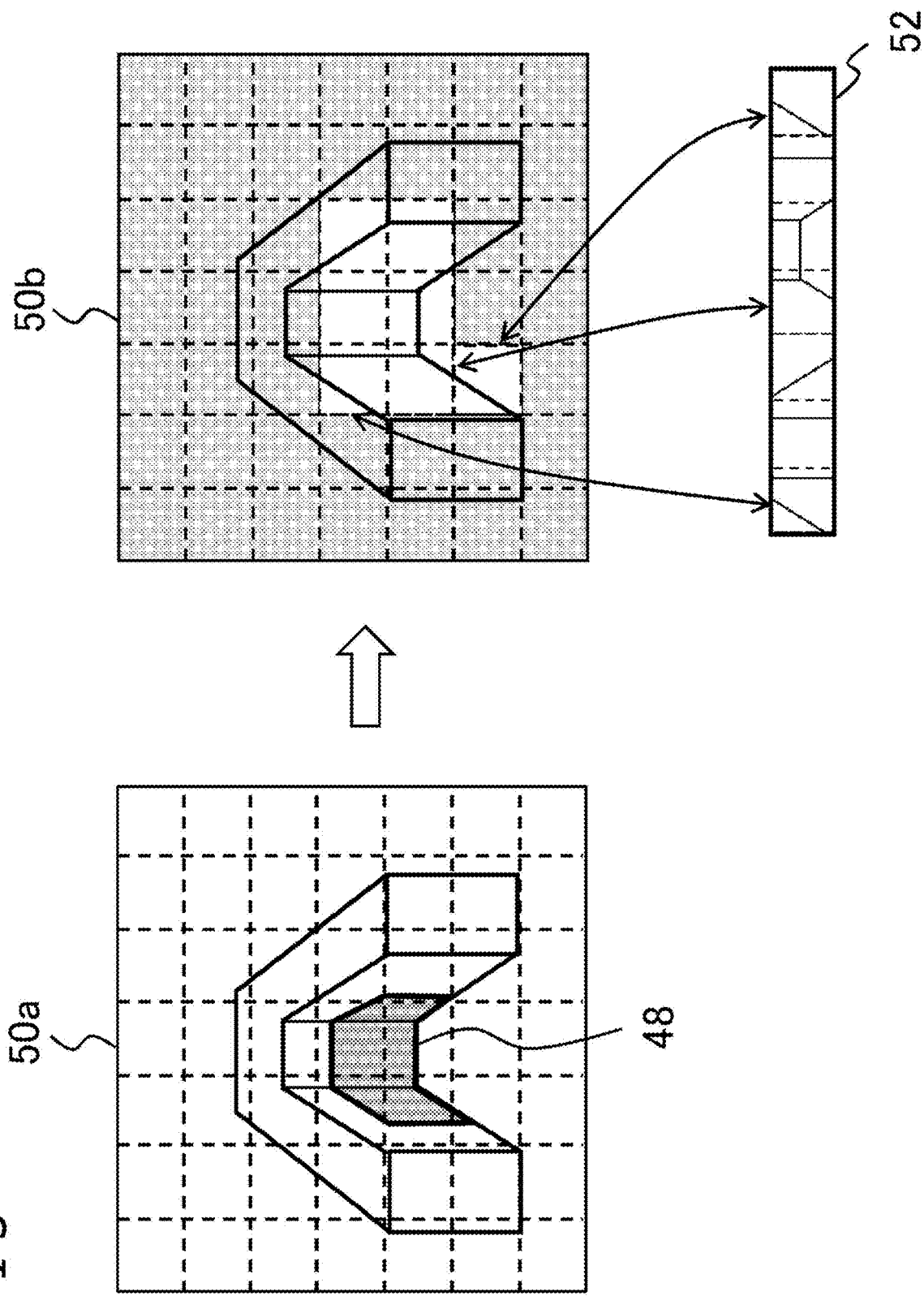
FIG. 13 is a diagram schematically illustrating a state of deleting part of the data from the reference image according to the present embodiment.

FIG. 13 schematically illustrates a state of deleting part of the data from the reference image. First, a reference image 50a corresponds to the reference image 46b in FIG. 11. The image data is deleted on the basis of tile images obtained by dividing the image plane into images in a predetermined size as indicated by dotted lines. In the illustrated example, the tile image including the part 48 viewed from only the corresponding reference point of view is left, and the other tile images are deleted. The tile images to be deleted are shaded in a reference image 50b.

Furthermore, reference image data 52 is generated by connecting only the left tile images, and index data is generated such that the position coordinates of the tile image in the plane of the original reference image are associated with the main body of the image data. The reference image data 52 and the index data are put together to form data of the reference image. Although three associations as index data are schematically indicated by arrows in FIG. 13, the position coordinates on the image plane can be actually associated with the address or the like of the storage region storing the main body of the image data, for each tile image.

As a result, by setting a large number of reference points of view, an object in a complicated shape or an object overlapping another object can also be drawn by using the reference images, and an increase in the data size of the reference images due to this can be reduced. The reference image generation apparatus 300 executes the process of deleting the data or formatting the data along with the generation of the reference images. Note that although the redundancy of the reference images due to the spatially close reference points of view is used in the data compression method described above, temporal redundancy can be used in a case where the reference images include moving image data including a plurality of image frames.

For example, even if the tile image in the previous frame is applied, the accuracy of the display image drawn by using the tile image can be maintained, particularly in a case of an object without movement in moving images or an object at a low speed even when the object moves. Therefore, the data deletion unit 328 may delete, from one of the frames, the data of the tile image displaying the image of the same object among the frames of moving images viewed from the same reference point of view. In this case, the data structure can also be similar to the data structure illustrated in FIG. 13.

Figure 14:
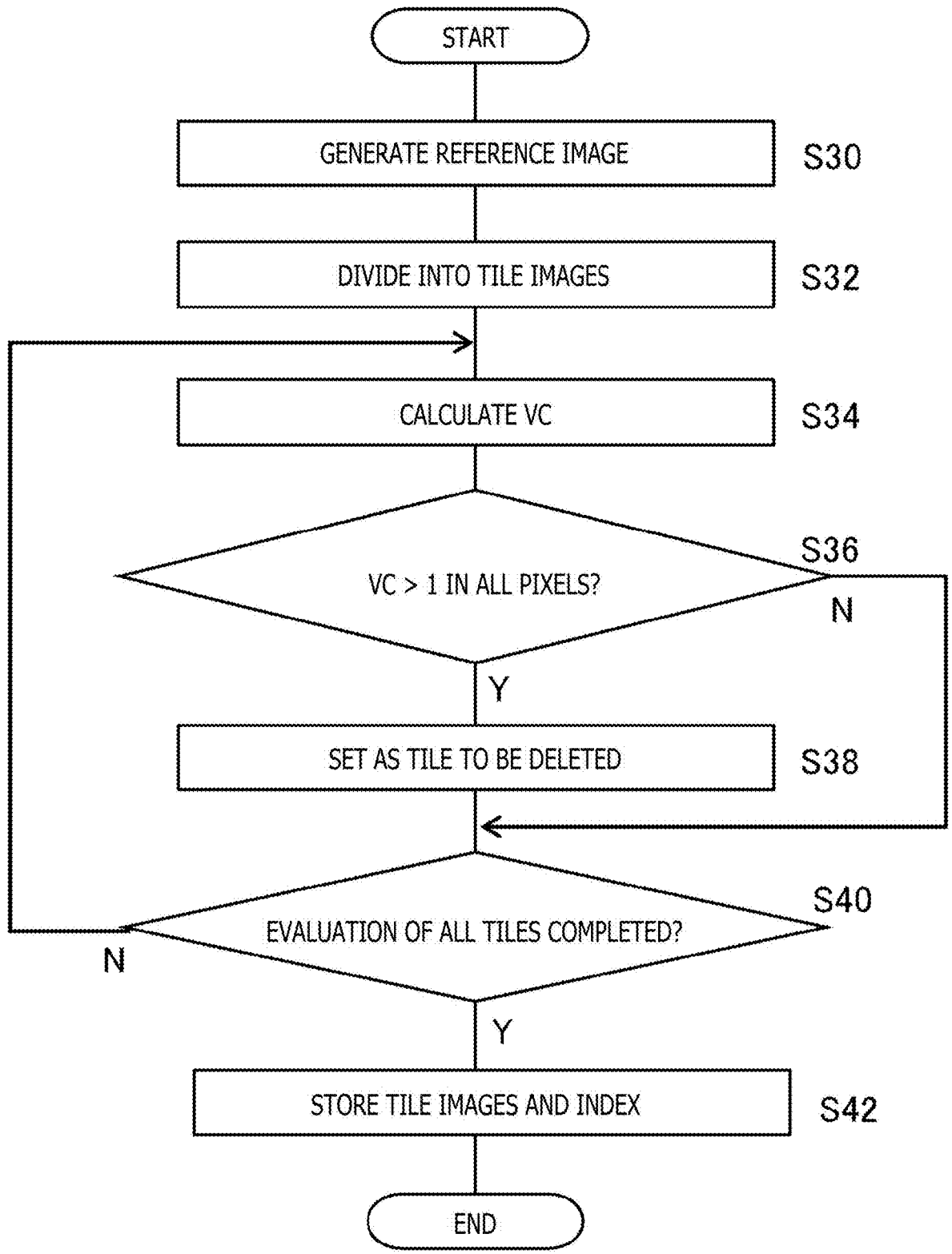
FIG. 14 is a flow chart illustrating a procedure of generating reference image data including the deletion of the data executed by a reference image data generation unit of the reference image generation apparatus according to the present embodiment.

FIG. 14 is a flow chart illustrating a procedure of generating the reference image data including the deletion of the data executed by the reference image data generation unit 318 of the reference image generation apparatus 300. First, the reference image drawing unit 326 of the reference image generation unit 322 uses a method of ray tracing or the like as described above to draw the object viewed from the reference points of view to thereby generate the reference images (S30). In this case, the depth image generation unit 324 generates the depth images corresponding to the reference images.

Next, the data deletion unit 328 of the reference image generation unit 322 divides each reference image into tile images in a predetermined size as illustrated in the reference image 50a of FIG. 13 (S32). Next, for each pixel included in each tile image, the data deletion unit 328 calculates a parameter (hereinafter, referred to as "VC (Visibility Count)" representing the number of reference points of view from which the point on the object displayed by the pixel can be viewed (S34). The process can be similar to the process of determining the reference image to be used to determine the pixel value of the display image in S18 of the flow chart illustrated in FIG. 10.

That is, when the difference between the distance from each reference point of view to the point on the object and the depth value indicated by the depth image generated in association with the reference image is smaller than the threshold, it is determined that the point is viewed from the reference point of view, and 1 is added to the parameter VC. VC of the pixel representing a point viewed from only one reference point of view is 1. VC of the pixel representing a point viewed from a plurality of reference points of view is greater than 1.

Therefore, in a case where VC of all of the pixels included in the tile image is greater than 1, the image displayed in the tile image can be drawn by using the data of other reference images just like the shaded tile image of the reference image 50b in FIG. 13, and the image is set as a deletion target (Y in S36, S38). The tile image including a pixel with VC of 1 at least partially includes part of the object displayed only in the reference image, and the tile image is not deleted (N in S36).

The evaluation for each tile image is repeated for all of the tile images included in the reference images (N in S40, S34 to S38). Note that the process of S34 to S38 is applied to the reference images selected by a predetermined standard, such as for each of reference points of view at certain intervals, among the reference images generated in S30. Alternatively, VC may be calculated for each pixel in all of the reference images, and the reference images from which the tile images will be deleted may be determined later. For example, the numbers of tile images to be deleted may be as uniform as possible in all of the reference images.

In such a case, VC of the pixels representing the same point on the object is common to the reference images, and VC can be applied to the pixels. As a result, the process of S34 does not have to be applied to all of the pixels in all of the reference images. In this way, once whether or not to delete the tile image is evaluated for all of the tile images (Y in S40), the index data generation unit 330 generates index data in which the tile images not to be deleted are associated with the position coordinates in the original reference image plane and stores the index data in the reference image data storage unit 320 in association with the tile image data (S42).

In this case, the reference image not including the tile image to be deleted can also have a data structure including the tile image and the index data, and the reference image data can be uniformly handled in the drawing process regardless of whether or not the tile image is to be deleted. Furthermore, in the index data, the position coordinates corresponding to the tile image to be deleted are associated with identification information indicating that the data is invalid. The pixel value determination unit 266 of the image generation apparatus 200 uses the reference image data generated in this way to determine the pixel value C of the display image based on the following equation.

[Math. 3]

$$C = \frac{\sum_i^N w'_i \cdot B_i \cdot V_i \cdot c_i}{\sum_i^N w'_i \cdot B_i \cdot V_i}$$

(Equation 3)

Here, as in equation 1 of a case in which the time image is not deleted, N represents the number of reference images used, i ($1 \leq i \leq N$) represents the identification number of the reference point of view, and $c_i$ represents the corresponding pixel value in each reference image. On the other hand, a weighting coefficient $w'_i$ in equation 3 represents a value before the normalization of setting the sum as 1, and the weighting coefficient w'$_i$ depends on the distance between the points of view, the angle with respect to the point on the object, and the like. In addition, B$_i$ is a flag indicating 1 if the tile image including the corresponding pixel in each reference image is valid and indicating 0 if the tile image is invalid. B$_i$ is 0 if the identification information indicative of invalid data is associated with the position coordinates of the tile image in the index data, and B$_i$ is 1 in other cases.

Note that in deleting the data of the tile image, the reference image generation unit 322 may separately create index data associating the position of the pixel on the deleted tile image with the position of the pixel on another reference image representing the point on the same object. In this way, the data of the pixel values is shared by a plurality of reference images. The image data is compressed, and the pixels on all of the reference images substantially have pixel values as entities. In this case, the pixel value C can be determined by equation 1.

Note that the data compression using the redundancy of the reference images is particularly effective in a case of the material in which the angular dependence on the light beam from the object is low, and the diffuse reflection components are dominant. On the other than, in an object or an environment in which light with strong directivity is generated, images from as many reference points of view as possible can be reserved in relation to the reference images displaying the same object, and a minute change according to the movement of the point of view can be expressed. Therefore, the reference image generation apparatus 300 may determine the data to be deleted on the condition that the same point on the object can be viewed from a plurality of reference points of view, and the difference between the pixel values representing the point in the reference images is not equal to or greater than a threshold.

Figure 15:
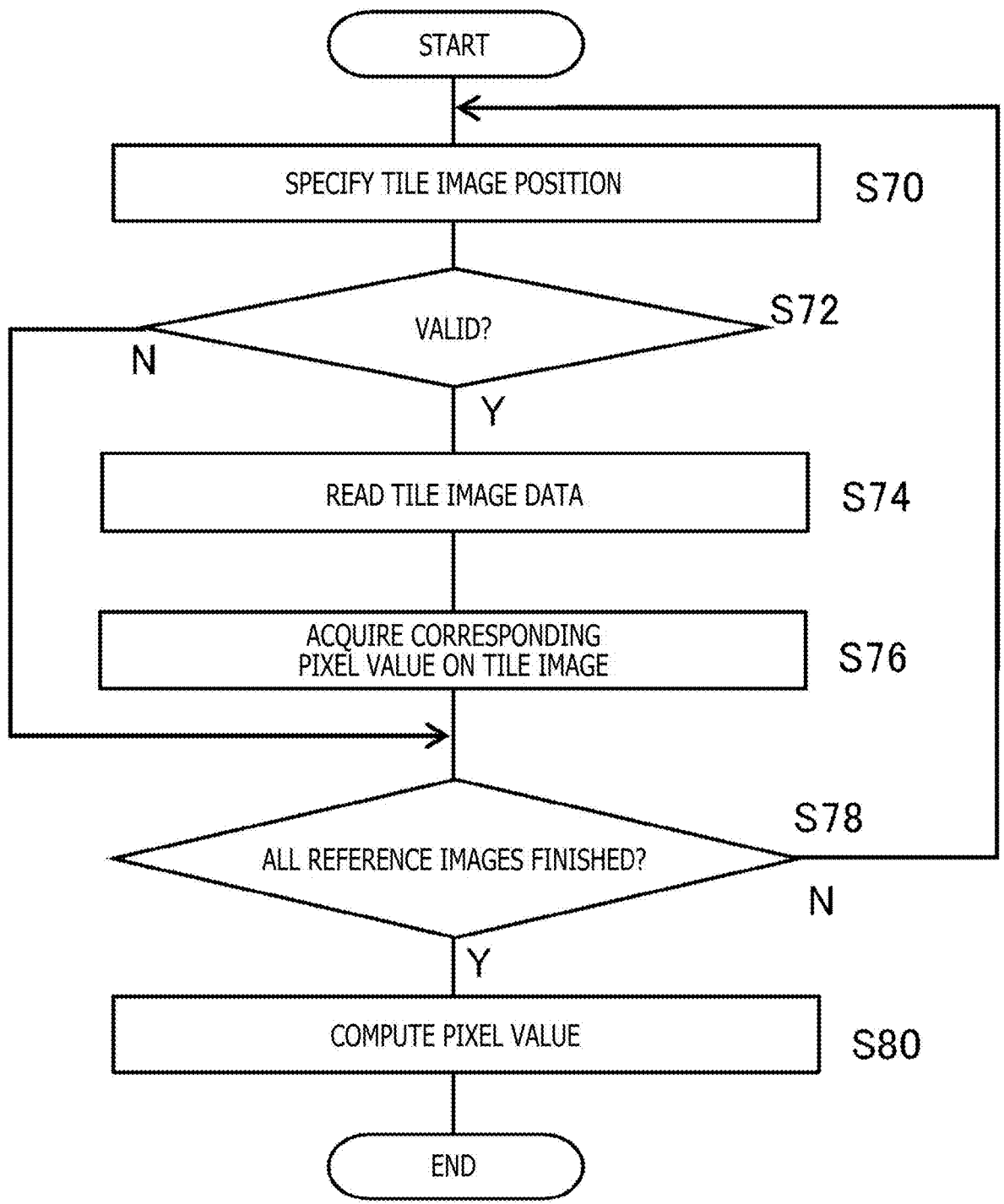
FIG. 15 is a flow chart illustrating a procedure of the pixel value determination unit of the image generation apparatus determining the pixel value by using the reference image in which part of the data is deleted according to the present embodiment.

FIG. 15 is a flow chart illustrating a procedure of the pixel value determination unit 266 of the image generation apparatus 200 determining the pixel value by using the reference image in which part of the data is deleted. The process corresponds to the process of S20 in FIG. 10. Therefore, it is assumed that the reference images to be used to determine the pixel value are found out in the previous stage. The pixel value determination unit 266 first targets one of the reference images to be used and specifies the position of the tile image including the pixel corresponding to the target pixel on the view screen (S70). The pixel value determination unit 266 then refers to the index data corresponding to the reference image and determines whether or not the tile image is valid (S72).

In a case where the tile image is valid (Y in S72), that is, in a case where the entity of the data is associated with the position coordinates of the tile image, the pixel value determination unit 266 reads the data (S74) and acquires the value of the corresponding pixel in the data (S76). In a case where the tile image is invalid (N in S72), that is, in a case where the tile image is deleted from the data of the reference image, the pixel value determination unit 266 does not read the data. The pixel value determination unit 266 repeats the process of S70 to S76 for all of the reference images to be used (N in S78), and once the process is completed (Y in S78), the pixel value determination unit 266 calculates the weighted average of the pixel values acquired in S76 to determine the final pixel value (S80).

Note that equation 3 described above realizes the illustrated procedure at once by setting B$_i$=1 in a case where the determination result of S72 is valid and setting B$_i$=0 in a case where the determination result of S72 is invalid. Furthermore, when it is determined that the tile image is invalid in S72 in a case of deleting the tile image due to the redundancy in the time direction in the frame of the moving image, the data of the corresponding pixel in a previous frame can be read and used to calculate the weighted average.

According to the method described above, the color of the surface of the object viewed from a virtual camera corresponding to the point of view of the user can be approximated by the color of the object viewed from a reference point of view close to it, and the image from a free point of view can be drawn responsively. On the other hand, in a situation where the specular reflectance of the surface of the object is high so that another object is reflected, the reflected object and the position actually change depending on the position of the point of view. Therefore, there may be a sense of discomfort when only the approximation of the color based on the image at the neighboring reference point of view is used.

Figure 16:
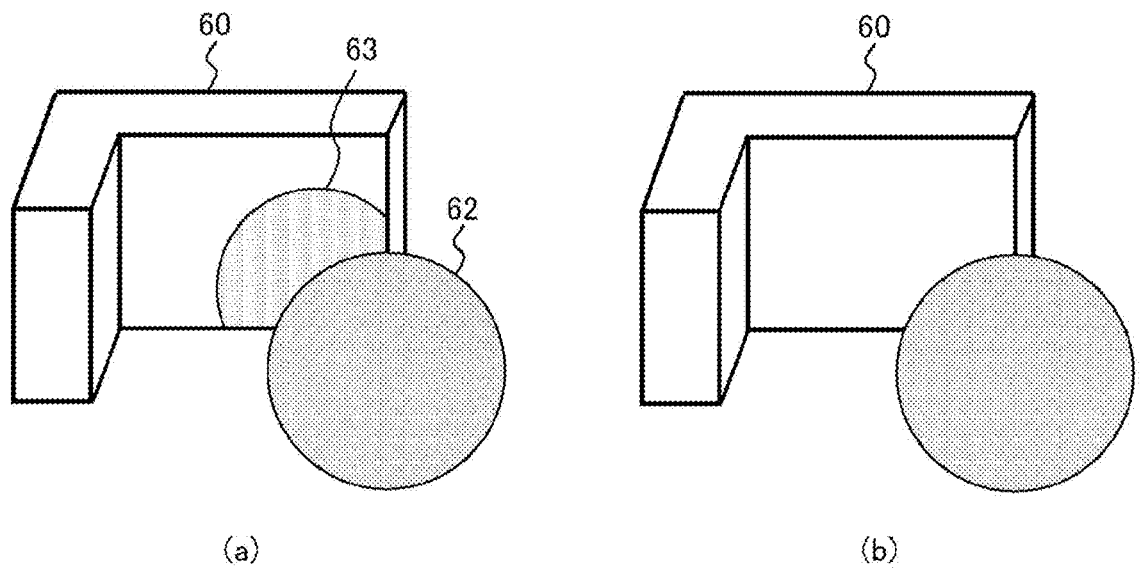
FIG. 16 is a diagram for describing an image drawing method when reflection of another object is taken into account according to the present embodiment.

FIG. 16 is a diagram for describing an image drawing method when the reflection of another object is taken into account. As illustrated in FIG. 16(a), in a case where an L-shaped object 60 is material with high specular reflectance such as metal, an image 63 of another object 62 in front is reflected. The image 63 actually moves according to the position of the point of view. If the method described above is used to perform the approximation based on the image viewed from a fixed reference point of view, the image 63 does not clearly move, although there is a little change due to the weighting. This may discomfort the viewer.

Therefore, as illustrated in FIG. 16(b), the state without the reflection, that is, the pixel value representing the original color of the object 60, is first acquired, and the color of reflection is separately acquired to combine the colors to thereby express the reflected image 63 as in FIG. 16(a). A method similar to the method described above can be used to draw the object 60 in the state without the reflection. However, the reflection is also not drawn in the prepared reference images in this case. In addition, as described later, the reference images displaying the reflection of the image 63 are separately prepared depending on the method of drawing the reflection.

Figure 17:
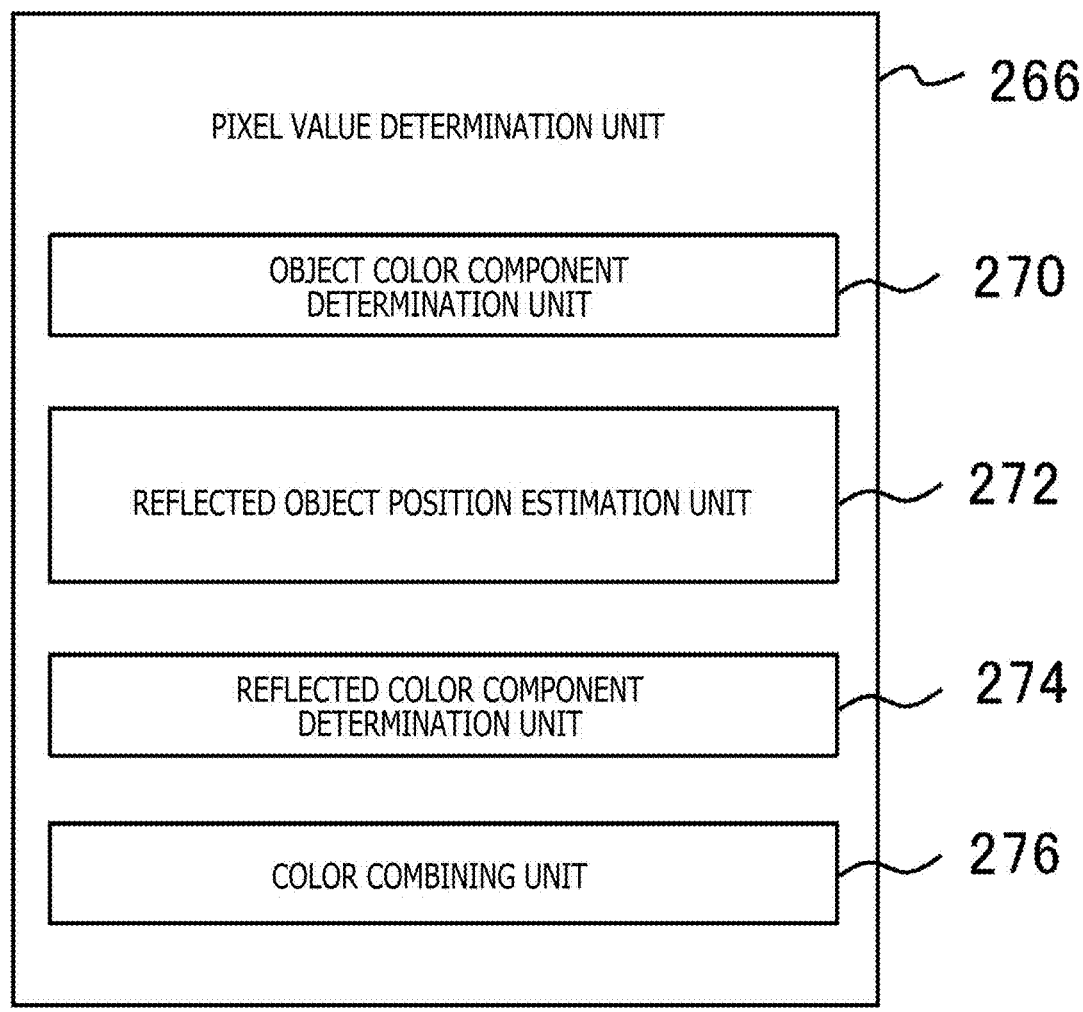
FIG. 17 is a diagram illustrating a configuration of functional blocks of the pixel value determination unit of the image generation apparatus in a mode of accurately expressing reflection on the surface of the object according to the present embodiment.

FIG. 17 illustrates a configuration of functional blocks of the pixel value determination unit 266 of the image generation apparatus 200 in the mode of accurately expressing the reflection on the surface of the object. The pixel value determination unit 266 includes an object color component determination unit 270, a reflected object position estimation unit 272, a reflected color component determination unit 274, and a color combining unit 276. The object color component determination unit 270 determines the value representing the original color of the point, such as the point 26 of FIG. 9, on the object displayed by the target pixel. Here, the original color is obviously information in which the change of tone caused by the state of the surrounding light or the like is taken into account, and the method illustrated in FIG. 9 can be used to determine the original color based on the reference images.

The reflected object position estimation unit 272 estimates the position on another object reflected on the point of the object displayed by the target pixel, in the three-dimensional space to be drawn. In such a case, although whether the object exists in the regular reflection direction of the gaze vector from the virtual camera is searched in the conventional technique such as ray tracing, the reference images or the depth images corresponding to the reference images can be used in the present embodiment to estimate the position with a low processing load. The specific example will be described later.

The reflected color component determination unit 274 specifies the pixel position where the section is displayed in the reference image, based on the position on another object reflected on the target pixel in the three-dimensional space. Furthermore, the reflected color component determination unit 274 refers to the pixel value of the position to determine the value of the color generated by the reflection. The reference image used here is an image displaying the state without the reflection, that is, displaying the original color of the object. Therefore, in the process, the pixel position on substantially the back side of the pixel position that should be referenced is referenced in the cylinder of the reference image.

The color combining unit 276 combines the original color components of the object to be drawn determined by the object color component determination unit 270 and the color components generated by the reflection determined by the reflected color component determination unit 274. For example, the color combining unit 276 uses predetermined alpha values to obtain the weighted average to thereby perform alpha blending. Note that the functions of the reflected object position estimation unit 272, the reflected color component determination unit 274, and the color combining unit 276 may be only valid in a situation where the reflection of another object needs to be expressed, such as a case in which the specular reflectance of the object to be drawing is equal to or greater than a threshold.

Figure 18:
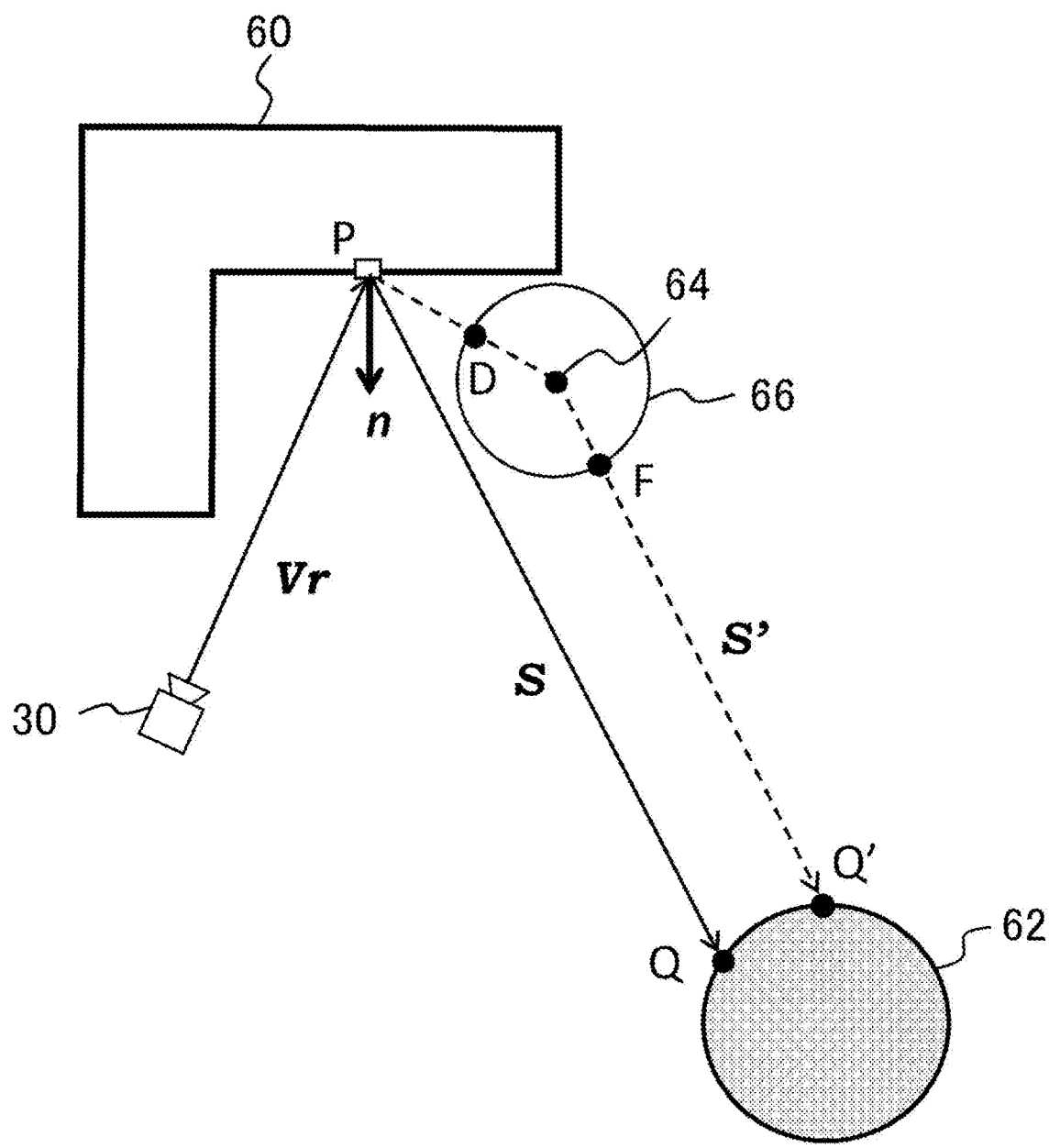
FIG. 18 is a diagram for describing a method of using one reference image to determine reflected color components according to the present embodiment.

Next, a method of specifying the section on another object reflected on the object to be drawn and acquiring the color of the section from the reference image executed by the reflected object position estimation unit 272 and the reflected color component determination unit 274 will be described. FIG. 18 is a diagram for describing a method of using one reference image to determine the reflected color components. FIG. 18 illustrates the situation illustrated in FIG. 16 and illustrates a state of overlooking the space to be displayed including the virtual camera 30 corresponding to the point of view of the user, the object 60 to be drawn, and the object 62 reflected on the object 60.

A reference point of view 64 is a reference point of view closest to, for example, the object 60, and a circle around the reference point of view 64 is a reference image 66 in FIG. 18. The reference image is an image representing the state without the reflection as described above. Therefore, for example, in drawing an image of a point P on the object 60, the object color component determination unit 270 uses the pixel value of a position D on the reference image 66 to determine the original color components of the point P. However, in the process, a plurality of reference images displaying the image of the point P may be used to calculate the weighted average based on equation 1 to obtain the value of the color.

On the other hand, the reflected object position estimation unit 272 estimates, in the three-dimensional space, the position of a point Q on the object 62 reflected on the point P. As illustrated in FIG. 18, the point Q is a point where a target vector (hereinafter, referred to as "reflection vector") S on the same plane as the gaze vector Vr from the virtual camera 30 with respect to a normal vector n of the surface of the object 60 at the point P reaches the surface of the object 62. Therefore, with the reference point of view 64 as a start point, the position of a point Q' where a vector S' parallel to the reflection vector S reaches the surface of the object 62 is obtained, and the position is set as an estimated position of the original point Q.

The closer the reference point of view to the point P, the closer the point Q' to the point Q. In addition, the farther the object 62 from the point P, the more the ratio of the distance between the points Q and Q' to the area of reflection can be ignored. In this case, the reflected object position estimation unit 272 does have to directly obtain the position coordinates of the point Q' and can obtain the reflection vector S based on the gaze vector Vr to obtain the direction of the vector S' parallel to the reflection vector S from the reference point of view 64. As a result, the reflected color component determination unit 274 can specify a position F on the reference image 66 corresponding to the obtained direction to acquire the color of the point Q'.

Figure 19:
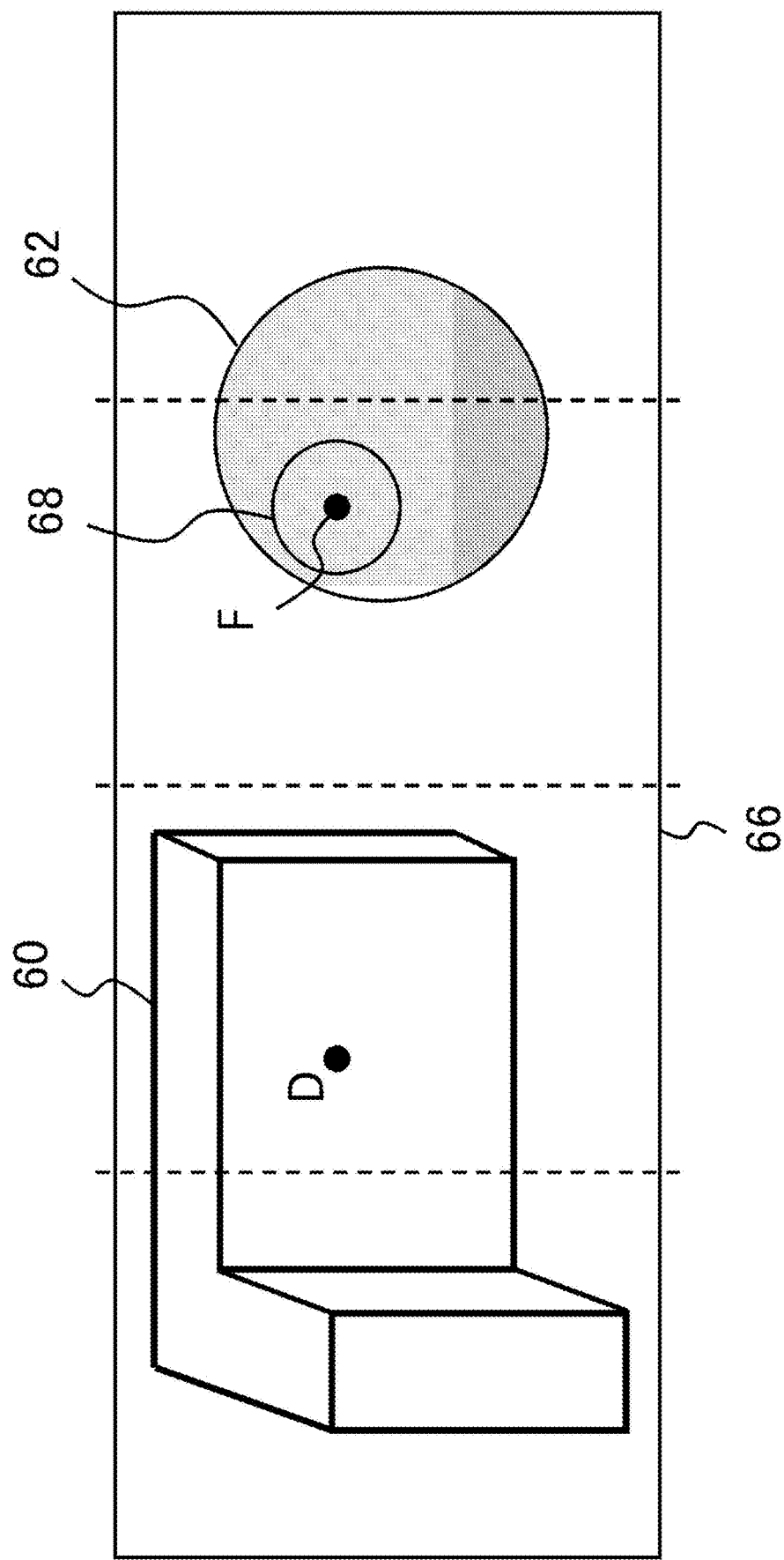
FIG. 19 is a diagram schematically illustrating a position on the reference image referenced in the method illustrated in FIG. 18.

FIG. 19 schematically illustrates the position on the reference image referenced in the method illustrated in FIG. 18. The reference image 66 is an image indicating the direction of 360° around the reference point of view 64, and according to the equirectangular projection, the reference image 66 can be expressed by a developed view with the latitude and the longitude indicated vertically and horizontally as illustrated in FIG. 19. As described above, the reflection of the object 62 in the image of the object 60 is not displayed in the reference image in this mode. The position D of the reference image 66 indicates the original color when the point P to be drawn is viewed from the reference point of view 64. In addition, the position F indicates the color of the point Q' that can be approximated to the point Q on the object 62 to be reflected on the point P as described in FIG. 18.

The object color component determination unit 270 refers to the former, and the reflected color component determination unit 274 refers to the latter to use them to determine the colors. The color combining unit 276 appropriately blends them to determine the final pixel value. Note that the reflected color component determination unit 274 may use the color of a predetermined range 68 around the position F to determine the color generated by the reflection. For example, the color of the position F obtained by using a low-bass filter to filter the color of the range 68 at a set frequency according to the roughness of surface or the material set for the object 60 may be set as the color of the reflection components. Alternatively, a color randomly selected from the range 68 may be set as the color of the reflection components.

In this way, the reflection can be expressed in an appropriately blurred state according to the state of surface or the material of the object 60. Alternatively, to express the reflection, the reference images may be prepared at resolutions in a plurality of levels, and the reference image to be referenced may be switched according to the surface roughness of the object 60. In the method illustrated in FIG. 18, the position of the surface of the object 62 in the three-dimensional space does not have to be searched, and the reflection corresponding to the point of view can be expressed with a low processing load.

Figure 20:
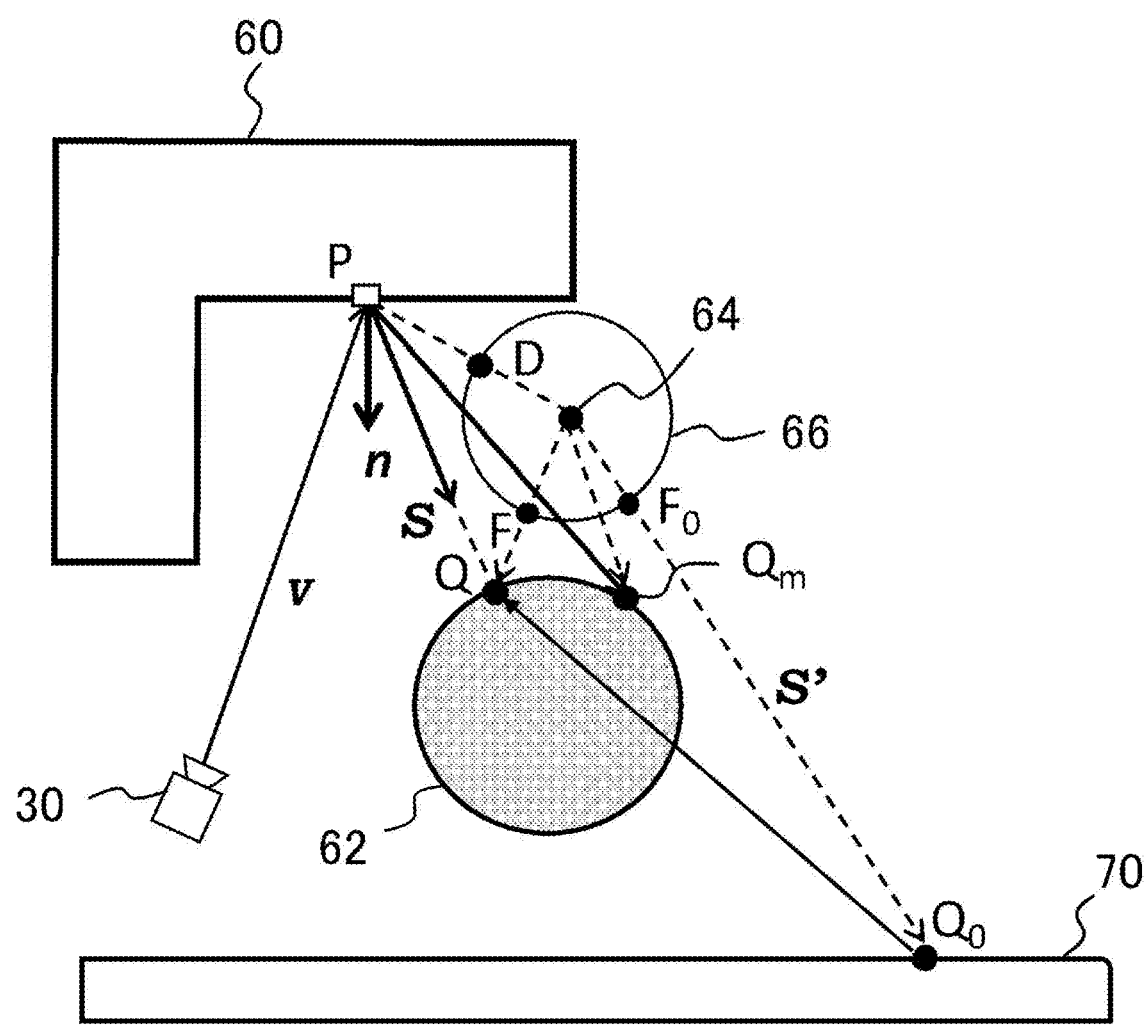
FIG. 20 is a diagram for describing a method of determining the reflected color components when the existence of the object at a close position is taken into account according to the present embodiment.

On the other hand, if the object 62 is at a position close to the point P or the reference point of view 64, the area of the image of the object 62 displayed at them is large. Therefore, the difference between the original point Q and the point Q' estimated from the reflection vector S apparently becomes large, and the approximation accuracy is deteriorated. FIG. 20 is a diagram for describing a method of determining the reflected color components when the existence of the object 62 at a position close to the point P or the reference point of view 64 is taken into account.

Although FIG. 20 illustrates a space similar to FIG. 18, the object 62 exists near the object 60 or the reference point of view 64.

In the example, when the vector S' parallel to the reflection vector S is defined with the reference point of view 64 as the start point as in FIG. 19, the vector S' does not intersect the object 62 and reaches a point $Q_0$ on another object 70 such as a background. If the result is used as it is to determine the color of the point P, the other object 70 different from the object that should be reflected is displayed. Even if the vector S' reaches the surface of the object 62, a pixel position significantly different from the pixel position F representing the original point Q on the reference image may be obtained. The accuracy of color expression may be reduced.

Figure 21:
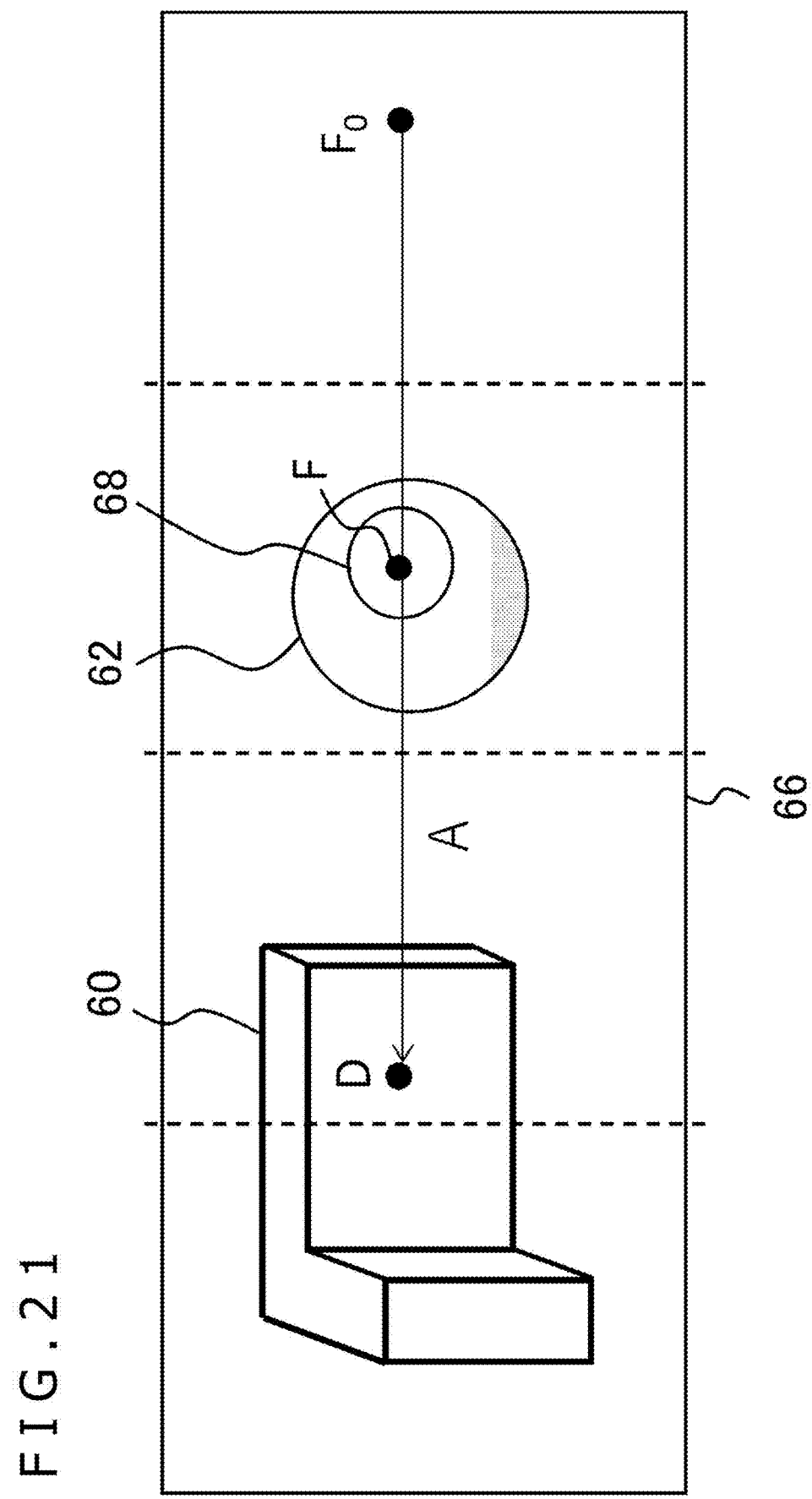
FIG. 21 is a diagram illustrating a state of search on the reference image performed by rotating a vector parallel to a reflection vector about the reference point of view according to the present embodiment.

Therefore, the direction of the vector S' is rotated about the reference point of view 64 to search for the direction for reaching the point Q on the object 62 that should be reflected. FIG. 21 illustrates a state of the search on the reference image performed by rotating the vector S' parallel to the reflection vector S about the reference point of view. In the reference image 66, the images of the object 60 and the object 62 are displayed in the original colors as in a case illustrated in FIG. 19. In addition, the position D corresponds to the point P to be drawn.

Furthermore, a position $F_0$ corresponds to the position $Q_0$ on the object where the vector S' parallel to the reflection vector S reaches. In the example illustrated in FIG. 20, the position $F_0$ is in a place outside of the image of the object 62 that should be reflected, that is, on the image of the object 70 not illustrated, such as the background. The rotation of the vector S' about the reference point of view 64 is equivalent to a search in the direction of the position D from the position $F_0$ on the reference image 66 as indicated by an arrow A.

If the direction when the rotated vector reaches the point Q on the object 62 that should be reflected can be recognized, the corresponding position F on the reference image 66 can also be specified. Therefore, the depth image corresponding to the reference image 66 is referenced to acquire the distance from the reference point of view to each object on the search route. In the three-dimensional space illustrated in FIG. 20, the position coordinates of the reference point of view 64 are known. Therefore, the information of the distance is used to find out the position coordinates of a point $Q_m$ on each object surface where the vector S' reaches when the vector S' is rotated.

Note that although FIG. 20 illustrates only one point $Q_m$, the point $Q_m$ actually moves on the surface of the object due to the rotation of the vector S'. Here, a vector $\overrightarrow{PQ_m}$ with the start point at the point P and the end point at the point $Q_m$ is defined, and the point $Q_m$ at the time that the angle formed by the vector $\overrightarrow{PQ_m}$ and the reflection vector S is the smallest is the point Q that should be reflected on the point P. For example, an evaluation value ε is defined as follows, and the point $Q_m$ at the time that the evaluation value ε is the smallest is obtained.

[Math. 4]

$$\varepsilon = 1 - \frac{\overrightarrow{PQ_m} \cdot \vec{S}}{|\overrightarrow{PQ_m}||\vec{S}|}$$ (Equation 4)

Furthermore, the position F on the reference image 66 displaying the image of the point Q is obtained based on the direction from the reference point of view 64 to the point Q. The reflected color component determination unit 274 uses the color of the position F on the reference image 66 or the color of the predetermined range 68 around the position F to determine the color generated by the reflection as in a case illustrated in FIG. 19.

Although the load of the method illustrated in FIGS. 20 and 21 is larger than the load of the method illustrated in FIGS. 18 and 19, the color generated by the reflection can be more accurately obtained. However, as described above, the process may become excessive depending on the distance to the object reflected on another object. Therefore, both methods may be adaptively switched according to the distance between the objects found out when the space construction unit 262 constructs the space to be displayed, the accuracy required for the display, and the like.

Figure 22:
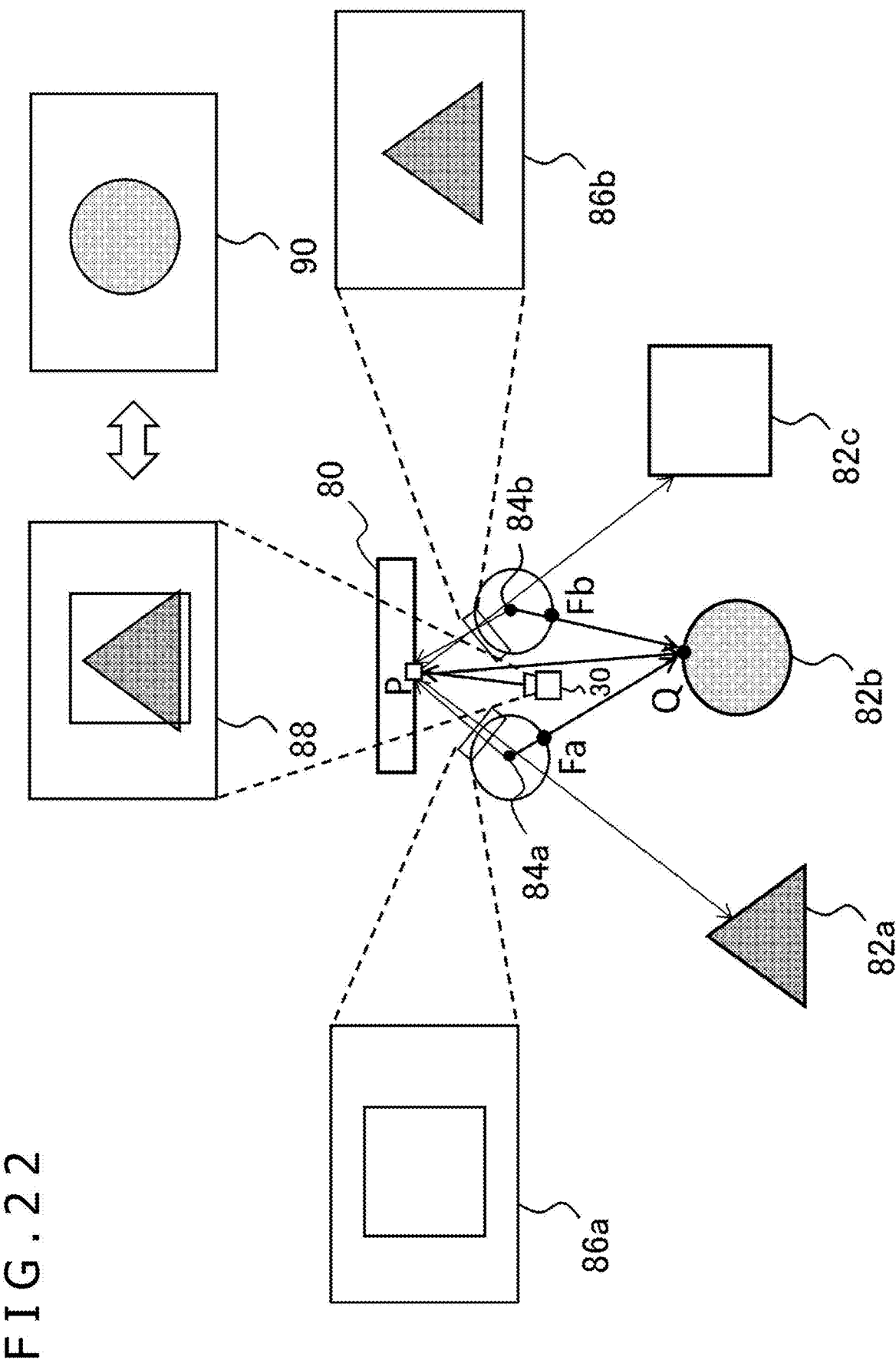
FIG. 22 is a diagram for describing a problem in a case where two reference points of view are set near an object with large specular reflectance, and the two reference points of view are simply referenced to draw the display image according to the present embodiment.

Next, a method of using two reference images to determine the reflected color components will be described. FIG. 22 is a diagram for describing a problem in a case where two reference points of view are set near an object with large specular reflectance, and the two reference points of view are simply referenced to draw a display image. FIG. 22 illustrates a state of overlooking a space including objects 80, 82a, 82b, and 82c and the virtual camera 30.

It is assumed that the object 80 is, for example, a material with high specular reflectance such as a mirror. It is assumed that reference points of view 84a and 84b are set near the object 80 in the space. As described above, the thing reflected on the object 80 varies depending on the position of the point of view. For example, the object 82c can be viewed from the reference point of view 84a, and the object 82a can be viewed from the reference point of view 84b. As a result, the image of the object 82c is displayed in the image of the reference point of view 84a (reference image 86a), and the image of the object 82a is displayed in the image of the reference point of view 84b (reference image 86b).

When the reference images are used to draw the image of the object 80 viewed from the virtual camera 30 in the middle between the reference points of view 84a and 84b, an image 88 in which the reference images 86a and 86b are superimposed is obtained, although an image 90 expressing the reflection of the object 82b should be obtained. In addition, the images in the reference images are fixed. Therefore, even when the virtual camera 30 moves, the image of reflection on the image obtained by combining the images does not move, and a sense of realism is lost.

Therefore, for example, the position Q on the object 82b reflected on the point P of the object 80 is estimated at the position of the illustrated virtual camera 30. Furthermore, as in the method described above, positions Fa and Fb displaying the position Q on the object 82b are referenced from the reference images of the reference points of view 84a and 84b to determine the color of reflection at the point P. In the method, a reference image without the reflection is generated for each of the reference points of view 84a and 84b, and the reference image displaying the reflection and the data representing the original position of the object displayed in the reference image are acquired in advance.

Figure 23:
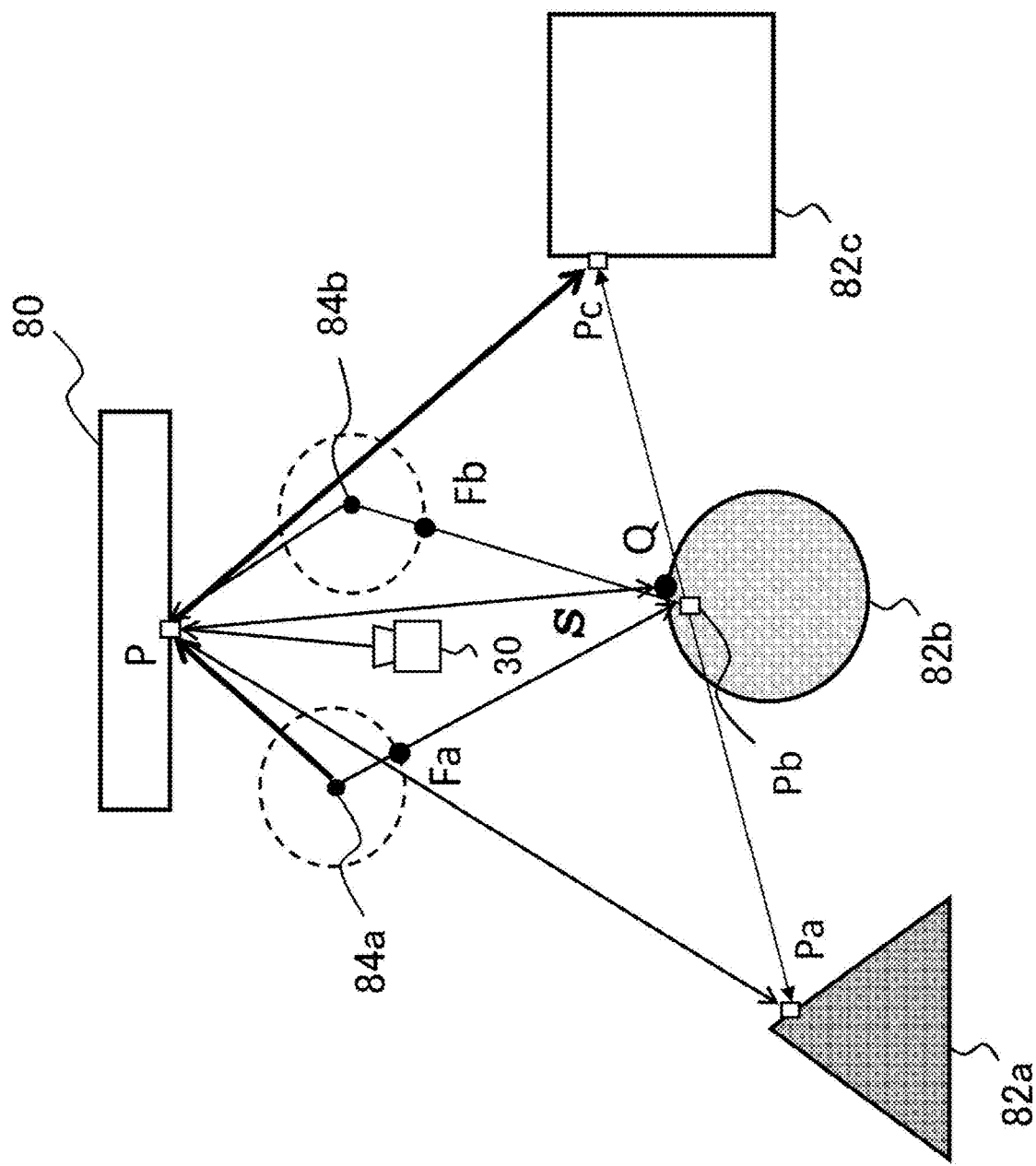
FIG. 23 is a diagram for describing a method of estimating a point on another object reflected on the object according to the present embodiment.

FIG. 23 is a diagram for describing a method of estimating the point Q on the object 82b reflected on the object 80 at the position of the virtual camera 30. In the conventional method of ray tracing not using the reference images, the existence of the object needs to be searched in the direction of the reflection vector S up to the surface of the object 82b. On the other hand, in the present embodiment, the information of the positions on the objects 82*a* and 82*c* reflected on the point P of the object 80 is acquired by the search in the regular reflection direction of the gaze vector from each of the reference points of view 84*a* and 84*c* in generating the reference images displaying the reflection.

For example, in generating the reference image of the reference point of view 84*a*, the ray tracing is performed in the direction of the regular reflection of the line of sight in viewing the position P from the point of view as indicated by a thick arrow to thereby acquire the position of a point Pc on the object 82*c*. Similarly, in generating the reference image of the reference point of view 84*b*, the ray tracing is performed in the regular reflection direction of the line of sight in viewing the position P from the point of view to thereby acquire the position of a point Pa on the object 82*a*.

Considering the positional relationship between the reference points of view 84*a* and 84*b* and the virtual camera 30, it can be recognized that the object reflected on the point as viewed from the virtual camera 30 is in the middle between the objects 82*a* and 82*c*. The principle is used to estimate the point Q on the object 82*b* from the points Pa and Pc on the object already acquired. For example, as illustrated in FIG. 23, in a case where the gaze vector of the reference point of view 84*a*, the gaze vector of the virtual camera, and the gaze vector of the reference point of view 84*b* are lined up in this order from the left in FIG. 23, it is estimated that the points Pa, Q, and Pc on the objects reflected on the point P are on the vectors obtained by inverting the corresponding gaze vectors about the normal vector of the point P.

Therefore, for example, a point Pb that can be approximated to the point Q is obtained by the following equation.

$$Pb = wa \cdot Pa + wc \cdot Pc \quad \text{(Equation 5)}$$

Note that Pb, Pa, and Pc in the equation represent the position coordinates of the points. In addition, wa and wc are weighting coefficients satisfying wa+wc=1, and for example, wa and wc are determined based on the distances between the corresponding reference points of view 84*a* and 84*b* and the virtual camera 30.

In this case, the weighting coefficient for the multiplication at the position (for example, position Pc) on the reflected object viewed from a reference point of view (for example, reference point of view 84*a*) is a variable in which the closer the virtual camera 30 to the reference point of view, the larger the variable, and the variable is 1 when the virtual camera 20 is at the position. According to the method, the "position" of the point on the reflected object is combined based on the positional relationship between the reference point of view and the virtual camera. However, it is not intended to limit the determination standard of the weighting coefficient to this, and other factors, such as the distance from the object 80, may also be taken into account.

In this way, once the point Pb for approximating the point Q on the reflected object 82*b* viewed from the virtual camera 30 is acquired, the colors of the positions Fa and Fb displaying the point Pb or the colors of predetermined ranges around the positions Fa and Fb in the reference images displaying the original colors of the object are used to determine the colors reflected on the position P as illustrated in FIG. 19. However, there are two reference images to be referenced in this case, and the weighting coefficients or the like based on the positional relationship between the virtual camera 30 and the reference points of view 84*a* and 84*b* are used to obtain the weighted average of the colors.

Note that as described above, the position information of the point of the surface on the reflected object viewed from the reference points of view 84*a* and 84*b* is found out in generating the reference images expressing the reflection, and the reference image generation apparatus 300 generates the position information in association with the reference images in a format similar to the depth images. As a result, the image generation apparatus 200 can immediately combine the positions dependent on the position of the virtual camera 30 at the drawing of the display image. In addition, although two reference images are used in the illustrated example, three or more reference images can be used depending on a case to execute a similar process to determine the color of reflection.

Figure 24:
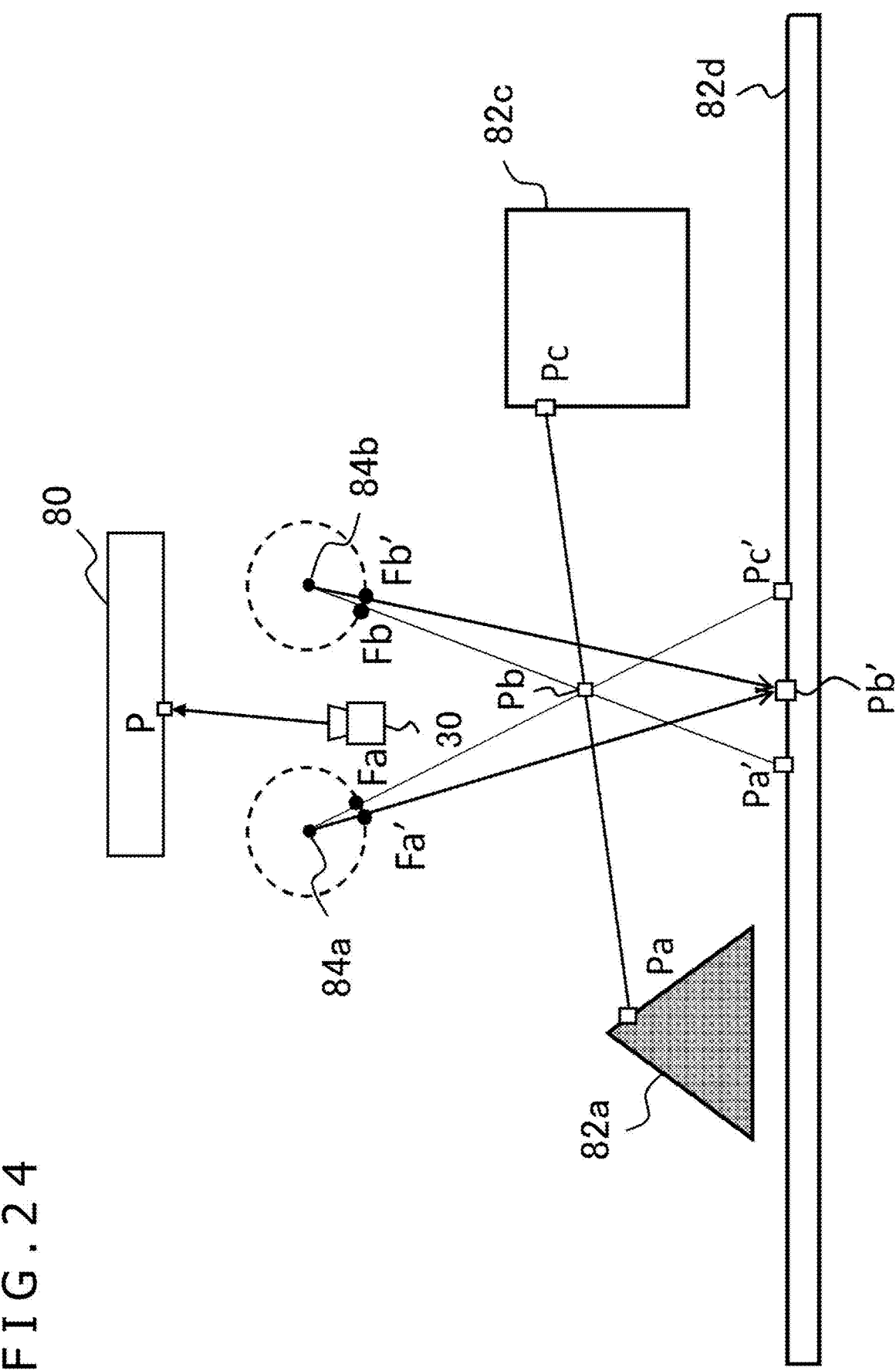
FIG. 24 is a view illustrating a case in which the reflected object is not at an estimated position according to the present embodiment.

In the method illustrated in FIG. 23, it is assumed that the objects 82*a*, 82*b*, and 82*c* that may be reflected on the object 80 are substantially arranged in a line. On the other hand, there can be a case in which the object actually does not exist at the point Pb obtained by combining the positions once based on Equation 5. FIG. 24 illustrates a case in which the reflected object viewed from the virtual camera 30 does not exist at the estimated position.

As illustrated in FIG. 23, the point Pb is estimated based on the positional relationship between the virtual camera 30 and the reference points of view 84*a* and 84*b* and based on the points Pa and Pc on the objects 82*a* and 82*c* reflected on the point P of the object 80 viewed from the reference points of view 84*a* and 84. Whether or not the object exists at the position is found out by comparing the depth values of the positions Fa and Fb in the reference images of the reference points of view 84*a* and 84*b* and the position of the point Pb. For example, as illustrated in FIG. 24, it is assumed that the depth values indicate positions Pa' and Pc' on an object 82*d* deeper than the position of the point Pb.

In this case, it is estimated that a reflected point Pb' on the object 82*d* can be viewed from the virtual camera 30. Therefore, in a case where the difference between the point Pb obtained by one estimation and the positions indicated by the corresponding depth values is equal to or greater than a threshold, the positions Pa' and Pc' indicated by the depth values are replaced with Pa with Pc of equation 5 to perform second estimation to acquire the new point Pb'. However, weighting coefficients wa and wb may be determined independently from the first computation. Furthermore, the colors of positions Fa' and Fb' or the like displaying the newly obtained point Pb' in the reference images of the reference points of view 84*a* and 84*b* are used to determine the color reflected on the position P.

Figure 25:
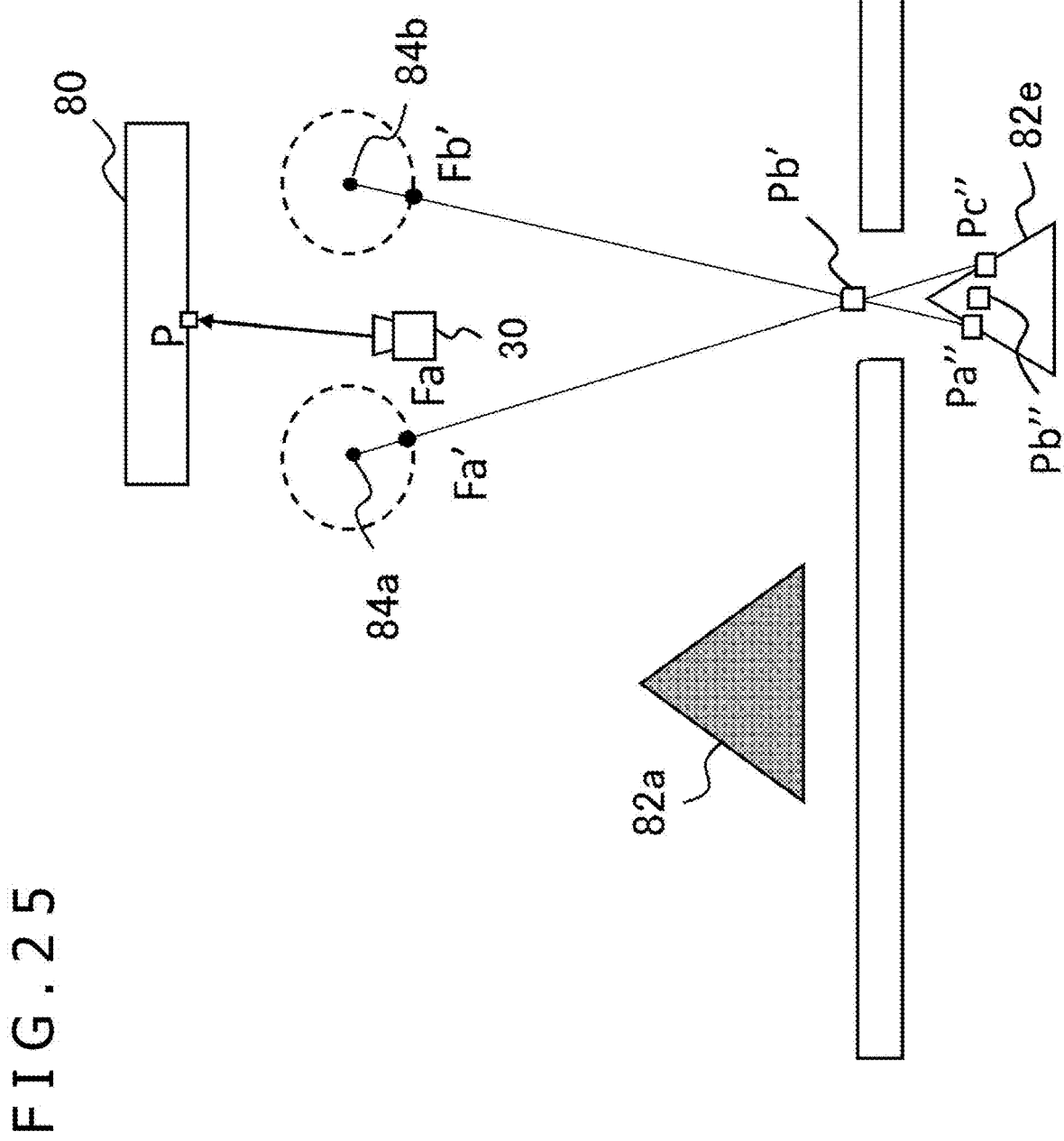
FIG. 25 is a view illustrating a case in which the reflected object does not exist at a position obtained by second estimation according to the present embodiment.

On the other hand, there is also a case in which the object does not exist at the position of the newly obtained point Pb'. FIG. 25 illustrates a case in which the reflected object viewed from the virtual camera 30 does exist at the position obtained by the second estimation. In this case, the position of the point Pb' and the depth values at the positions Fa' and Fb' in the reference images of the reference points of view 84*a* and 84*b* can be compared to recognize that the object does not exist at the position, and there is an object 82*e* at a deeper position. Therefore, positions Pa'' and Pc'' obtained from the depth values are replaced with Pa and Pc of equation 5 to perform third estimation to acquire a new point Pb''. In this way, the colors at corresponding positions of the reference images are used to determine the color reflected on the position P.

The computation of the position estimation can be repeated in this way to easily search the reflected object in a relatively wide range. However, when the distance to the reflected object becomes large as a result of the repetition of the estimation process, the change in the image with respect to the movement of the virtual camera 30 becomes small, and strict computation may not be necessary. Therefore, an upper limit may be set for the number of repetitions of the estimation process. In this case, the color may be determined by, for example, directly combining the colors of the positions Pa" and Pc" obtained from the depth values of the reference images, or the method may be switched to another method, such as ray marching that is a general search method.

Figure 26:
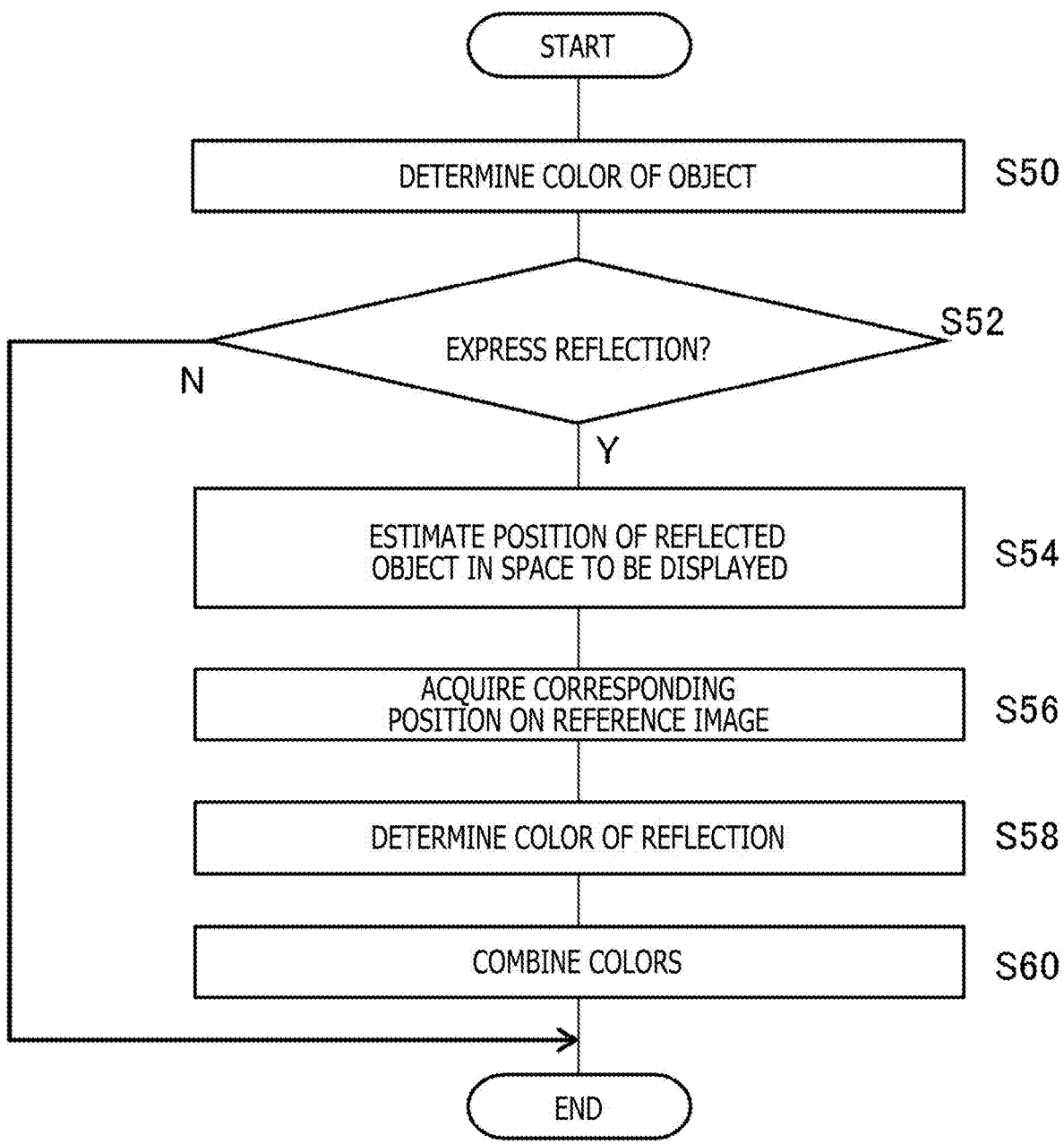
FIG. 26 is a flow chart illustrating a procedure of taking into account the reflection to determine the pixel value executed by the pixel value determination unit of the image generation apparatus according to the present embodiment.

FIG. 26 is a flow chart illustrating a procedure of taking into account the reflection to determine the pixel value executed by the pixel value determination unit 266 of the image generation apparatus 200. The flow chart can be replaced with the process of S20 in FIG. 10, and the procedure is executed for each target pixel. First, the object color component determination unit 270 uses a reference image in the state without reflection to determine the value representing the color of the object (S50). The process is similar to the process of S20 in FIG. 10, and this can obtain the color based on the state of light, the material of object, and the like.

In a case where the target pixel is a pixel in which the reflection does not have to be expressed, such as in a case where the specular reflectance is smaller than a threshold, the process ends (N in S52). In a case of expressing the reflection (Y in S52), the reflected object position estimation unit 272 estimates the position of the point on the object reflected on the target pixel in the space to be displayed according to the point of view of the virtual camera 30 based on the position and the posture of the head of the user (S54). Specifically, as illustrated in FIGS. 18 and 21, the reflected object position estimation unit 272 determines the point to be approximated by using the vector parallel to the reflection vector of the virtual camera 30, with the reference point of view as the start point, or performs the search based on the depth value of the reference image while rotating the vector.

Alternatively, as illustrated in FIGS. 22 to 25, the positions of the points of reflection obtained in generating a plurality of reference images are combined based on the positional relationship between the virtual camera and the reference points of view. Furthermore, the reflected color component determination unit 274 acquires the pixel position on the reference image corresponding to the estimated position (S56) and uses the color of the pixel position or the color in a predetermined range around the pixel position to determine the color components of the reflection (S58). The color combining unit 276 combines the original color of the object determined in S50 and the color generated by the reflection determined in S58 to determine the final pixel value (S60).

According to the present embodiment described above, the data of the images with respect to the preset reference points of view are prepared in the technique of displaying an image from an arbitrary point of view. Furthermore, in drawing the display image, the values of the pixels representing the same object are acquired from the prepared reference images to determine the pixel values of the display image. To calculate the pixel values, the positional relationship between the actual point of view and the reference point of view and the rule based on the attributes of the object are implemented. A lot of time can be spent to generate the reference image at timing different from the display corresponding to the point of view, and therefore, a high-quality reference image can be prepared. At the display, the values can be acquired from the high-quality image, and a high-quality image can be presented without spending a lot of time.

In addition, it is likely that the same part on the object is displayed in the reference images with close reference points of view, and this is used to delete the data of the overlapping part from the reference images. This can compress the data size of the reference images and increase the number of reference points of view without increasing the data size. As a result, even if the configuration of the space to be expressed and the shape of the object become complicated, both of the preciseness of the display image and the fastness of the drawing process including the handling of the image data and the like can be attained.

Furthermore, to express the reflection of another object on an object with high specular reflectance, the color determined by using the reference image in the state without the reflection is combined with the separately acquired color corresponding to the reflection. The reference image also displays the image at the original position of the reflected object, and the image can be referenced to determine the color corresponding to the reflection. The original position of the reflected object necessary in this case is also acquired by using various types of information obtained in generating the reference images. This can express an image with a sense of realism in which the reflection also moves according to the movement of the point of view, with a significantly low load compared to the conventional technique such as ray tracing.

The present invention has been described based on the embodiment. The embodiment is an example, and those skilled in the art would understand that various modifications are possible for the combinations of the constituent elements and the processes and that the modifications are also in the scope of the present invention.

For example, in the present embodiment, the original color of the object is once determined as a base, and then the color of reflection generated by another object is combined. In this case, the part displaying the image of the reflected object in the same reference image is referenced. On the other hand, the image to be referenced for determining the color to be combined can be a separately prepared image, and this allows to freely combine an image other than the image of reflection. For example, moving images in which the objects move can be prepared as images to be referenced, and the movement of part of the objects can be expressed even if the base images are still images. The size of the image data necessary in this case is significantly smaller than in a case where all of the reference images are moving images.

REFERENCE SIGNS LIST

100 Head-mounted display, 200 Image generation apparatus, 222 CPU, 224 GPU, 226 Main memory, 236 Output unit, 238 Input unit, 254 Object model storage unit, 256 Reference image data storage unit, 260 Point-of-view information acquisition unit, 262 Space construction unit, 264 Projection unit, 266 Pixel value determination unit, 268 Output unit, 270 Object color component determination unit, 272 Reflected object position estimation unit, 274 Reflected color component determination unit, 276 Color combining unit, 300 Reference image generation apparatus, 310 Reference point-of-view setting unit, 314 Object model storage unit, 316 Space construction unit, 318 Reference image data generation unit, 320 Reference image data storage unit, 322 Reference image generation unit, 324 Depth image generation unit, 326 Reference image drawing unit, 328 Data deletion unit, 330 Index data generation unit

INDUSTRIAL APPLICABILITY

As described above, the present invention can be used for various information processing apparatuses, such as a head-mounted display, a gaming apparatus, an image display apparatus, a mobile terminal, and a personal computer, an information processing system including one of them, and the like.

The invention claimed is:

1. An image generation apparatus comprising:
    a reference image data storage unit that stores data of a reference image representing an image of a space viewed from a predetermined reference point of view, the space including an object to be displayed;
    a point-of-view information acquisition unit that acquires information regarding a point of view;
    a projection unit that displays, on a plane of a display image, a position and a shape of an image of the object obtained by viewing the space from the point of view;
    a pixel value determination unit that determines, for each pixel in the display image, a color of the image of the object by using a color of an image of the same object in the reference image, specifies a position of an image of another object reflected on the object in the reference image, acquires a color at the position, and combines the colors to thereby determine a final value of the pixel representing the reflection; and
    an output unit that outputs data of the display image,
    wherein the pixel value determination unit estimates a point on the other object, which is a point where a vector in a regular reflection direction of a gaze vector defined by the point of view reaches in the space, by using information regarding the space acquired in generating the reference image and specifies a position of the image at the point in the reference image based on the point,
    wherein the reference image data storage unit stores, as the data of the reference image, data of an image representing a space in all directions around the reference point of view, and
    wherein the pixel value determination unit specifies, as the position of the image of the point, a position on the reference image corresponding to a direction parallel to the vector in the regular reflection direction.

2. The image generation apparatus according to claim 1, wherein
    the reference image data storage unit stores, as the data of the reference image, data of an image representing a space in all directions around the reference point of view, and
    the pixel value determination unit rotates a vector parallel to the vector in the regular reflection direction about the reference point of view and specifies a position on the object, which is a position where the vector reaches, based on a depth image corresponding to the reference image to thereby search the point.

3. The image generation apparatus according to claim 1, wherein
    the pixel value determination unit obtains, based on a positional relationship between the reference point of view and the point of view, a weighted average of the position of the other object, which is reflected on the object as viewed from the reference point of view, acquired as the information regarding the space to thereby estimate the point.

4. The image generation apparatus according to claim 3, wherein
    when a difference between a position of the estimated point and a position of the object indicated in the depth image corresponding to the reference image is equal to or greater than a predetermined threshold, the pixel value determination unit uses a weighted average of the position of the object indicated in the depth image to estimate the point again.

5. The image generation apparatus according to claim 1, wherein
    the pixel value determination unit applies a predetermined filter to pixels of a region in a predetermined range around the position of the image of the other object in the reference image to thereby determine the color to be combined.

6. The image generation apparatus according to claim 1, wherein
    the reference image data storage unit stores, for each reference point of view, data of a plurality of reference images with different resolutions, and
    the pixel value determination unit switches the resolution at a location of acquiring the color to be combined according to a state of a surface of the object for which the value of the pixel is to be determined.

7. An image generation method of generating a display image representing a space including an object to be displayed, the image generation method comprising:
    acquiring information regarding a point of view;
    displaying, on a plane of a display image, a position and a shape of an image of the object obtained by viewing the space from the point of view;
    reading, from a memory storing data of a reference image representing an image of the space viewed from a predetermined reference point of view, the data of the reference image, determining, for each pixel in the display image, a color of the image of the object by using a color of an image of the same object in the reference image, specifying a position of an image of another object reflected on the object in the reference image, acquiring a color at the position, and combining the colors to thereby determine a final value of the pixel representing the reflection; and
    estimating a point on the other object, which is a point where a vector in a regular reflection direction of a gaze vector defined by the point of view reaches in the space, by using information regarding the space acquired in generating the reference image;
    specifying a position of the image at the point in the reference image based on the point;
    storing, as the data of the reference image, data of an image representing a space in all directions around the reference point of view;
    specifying, as the position of the image of the point, a position on the reference image corresponding to a direction parallel to the vector in the regular reflection direction; and
    outputting data of the display image.

8. A non-transitory computer readable medium having stored thereon a computer program for a computer that generates a display image representing a space including an object to be displayed to realize, the computer program comprising:

by a point-of-view information acquisition unit, acquiring information regarding a point of view;

by a projection unit, displaying, on a plane of a display image, a position and a shape of an image of the object obtained by viewing the space from the point of view; and by a pixel value determination unit, reading, from a memory storing data of a reference image representing an image of the space viewed from a predetermined reference point of view, the data of the reference image, determining, for each pixel in the display image, a color of the image of the object by using a color of an image of the same object in the reference image, specifying a position of an image of another object reflected on the object in the reference image, acquiring a color at the position, and combining the colors to thereby determine a final value of the pixel representing the reflection, wherein the pixel value determination unit estimates a point on the other object, which is a point where a vector in a regular reflection direction of a gaze vector defined by the point of view reaches in the space, by using information regarding the space acquired in generating the reference image and specifies a position of the image at the point in the reference image based on the point, wherein the reference image data storage unit stores, as the data of the reference image, data of an image representing a space in all directions around the reference point of view, and wherein the pixel value determination unit specifies, as the position of the image of the point, a position on the reference image corresponding to a direction parallel to the vector in the regular reflection direction.

* * * * *